(12) United States Patent
Paolini, Jr. et al.

(10) Patent No.: US 12,179,203 B2
(45) Date of Patent: Dec. 31, 2024

(54) METHOD FOR REAGENT-SPECIFIC DRIVING EWoD ARRAYS IN MICROFLUIDIC SYSTEMS

(71) Applicant: Nuclera Ltd, Cambridge (GB)

(72) Inventors: Richard J. Paolini, Jr., Framingham (GB); Luke M. Slominski, Sharon, MA (US); Timothy J. O'Malley, Westford (GB); David Zhitomirsky, Woburn (GB)

(73) Assignee: NUCLERA LTD, Cambridge (GB)

( * ) Notice: Subject to any disclaimer, the term of this patent is extended or adjusted under 35 U.S.C. 154(b) by 14 days.

(21) Appl. No.: 17/497,512

(22) Filed: Oct. 8, 2021

(65) Prior Publication Data

US 2022/0111387 A1 Apr. 14, 2022

Related U.S. Application Data

(60) Provisional application No. 63/089,066, filed on Oct. 8, 2020.

(51) Int. Cl.
*B01L 3/00* (2006.01)

(52) U.S. Cl.
CPC ... *B01L 3/502792* (2013.01); *B01L 3/502715* (2013.01); *B01L 2200/0673* (2013.01);
(Continued)

(58) Field of Classification Search
CPC ..... B01L 2200/0621; B01L 2200/0673; B01L 2200/14; B01L 2200/16; B01L 2300/0645;
(Continued)

(56) References Cited

U.S. PATENT DOCUMENTS

| 6,565,727 B1 | 5/2003 | Shenderov |
| 6,773,566 B2 | 8/2004 | Shenderov |

(Continued)

FOREIGN PATENT DOCUMENTS

WO 2007/120241 A2 10/2007

OTHER PUBLICATIONS

Ma et al "A floating top-electrode electrowetting-on-dielectric system" RSC Adv.10, 4899-4906 (Year: 2020).*
(Continued)

*Primary Examiner* — Jennifer Wecker
*Assistant Examiner* — Jonathan Bortoli
(74) *Attorney, Agent, or Firm* — McCarter & English, LLP

(57) ABSTRACT

An electrowetting system for actuating droplets of a first composition and of a second composition. The system includes: a plurality of electrodes configured to manipulate droplets of fluid in a microfluidic space, each electrode being coupled to circuitry which applies driving voltages to the electrode; and a processing unit operably connected to a look up table correlating drive sequences to chemical species and at least one composition parameter. The processing unit is configured to: receive data of a first chemical species and a first composition parameter of the first composition; receive data of a second chemical species and a second composition parameter of the second composition; correlate a first drive sequence with the first chemical species and the first composition parameter; correlate a second drive sequence with the second chemical species and the second composition parameter; and output the first drive sequence and the second drive sequence to the electrodes.

14 Claims, 23 Drawing Sheets

(52) U.S. Cl.
CPC ... *B01L 2200/16* (2013.01); *B01L 2300/0645* (2013.01); *B01L 2400/0427* (2013.01)

(58) Field of Classification Search
CPC ..... B01L 2300/0816; B01L 2400/0427; B01L 3/502715; B01L 3/502792; G02B 26/005
See application file for complete search history.

(56) References Cited

U.S. PATENT DOCUMENTS

| | | | |
|---|---|---|---|
| 6,911,132 B2 | 6/2005 | Pamula et al. | |
| 6,977,033 B2 | 12/2005 | Becker et al. | |
| 7,052,244 B2 | 5/2006 | Fouillet et al. | |
| 7,163,612 B2 | 1/2007 | Sterling et al. | |
| 7,328,979 B2 | 2/2008 | Decre et al. | |
| 7,547,380 B2 | 6/2009 | Velev | |
| 7,641,779 B2 | 1/2010 | Becker et al. | |
| 8,173,000 B1 * | 5/2012 | Hadwen | G02B 26/005 204/600 |
| 2003/0205632 A1 | 11/2003 | Kim et al. | |
| 2005/0179746 A1 | 8/2005 | Roux et al. | |
| 2006/0039823 A1 | 2/2006 | Yamakawa et al. | |
| 2006/0054503 A1 * | 3/2006 | Pamula | B01F 33/3021 204/600 |
| 2006/0164490 A1 | 7/2006 | Kim et al. | |
| 2006/0194331 A1 | 8/2006 | Pamula et al. | |
| 2007/0023292 A1 | 2/2007 | Kim et al. | |
| 2007/0242111 A1 | 10/2007 | Pamula et al. | |
| 2008/0124252 A1 | 5/2008 | Marchand et al. | |
| 2009/0192044 A1 | 7/2009 | Fouillet | |
| 2009/0283407 A1 | 11/2009 | Shah et al. | |
| 2009/0321262 A1 | 12/2009 | Adachi et al. | |
| 2010/0096266 A1 | 4/2010 | Kim et al. | |
| 2011/0048951 A1 | 3/2011 | Wu | |
| 2012/0007608 A1 * | 1/2012 | Hadwen | G09G 3/348 324/649 |
| 2013/0168250 A1 * | 7/2013 | Fogleman | G01F 22/00 204/549 |
| 2014/0151232 A1 * | 6/2014 | Hadwen | G09G 3/348 204/547 |
| 2017/0056887 A1 * | 3/2017 | Hadwen | G01N 33/579 |
| 2017/0073729 A1 * | 3/2017 | Ho | B01L 3/502792 |
| 2019/0317118 A1 * | 10/2019 | Khomami Abadi | B82Y 15/00 |
| 2020/0041445 A1 * | 2/2020 | Chen | G01N 27/4145 |
| 2020/0171500 A1 * | 6/2020 | Hadwen | G01N 27/028 |
| 2022/0326137 A1 * | 10/2022 | Anderson | G01N 27/44791 |

OTHER PUBLICATIONS

Choi et al., Digital Microfluidics. Annu Rev Anal Chem (Palo Alto Calif). 2012;5:413-40.

Dhindsa et al., Virtual electrowetting channels: electronic liquid transport with continuous channel functionality. Lab Chip. 2010;10:832-836.

International Search Report and Written Opinion for Application No. PCT/GB2021/052611, dated Jan. 10, 2022, 9 pages.

* cited by examiner

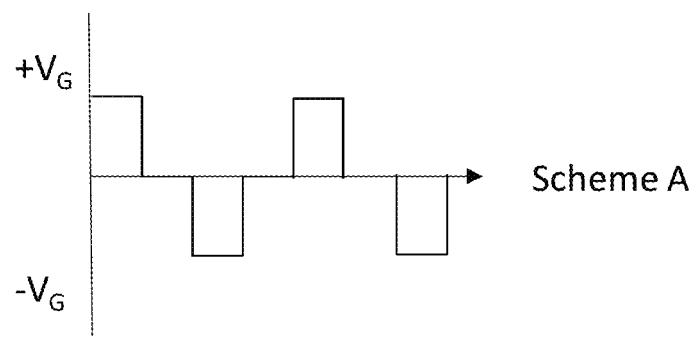
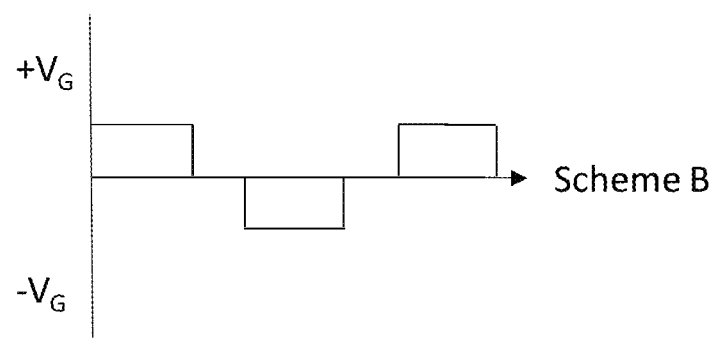
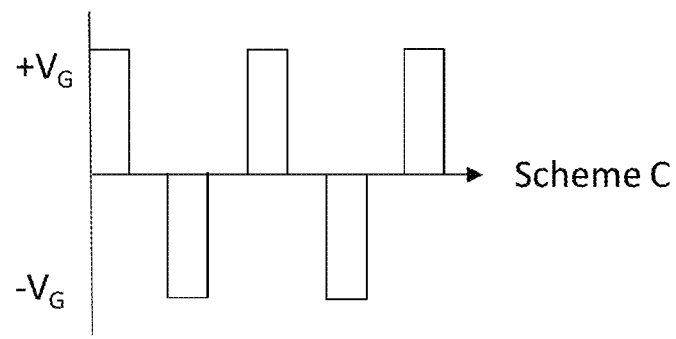
FIG. 3C

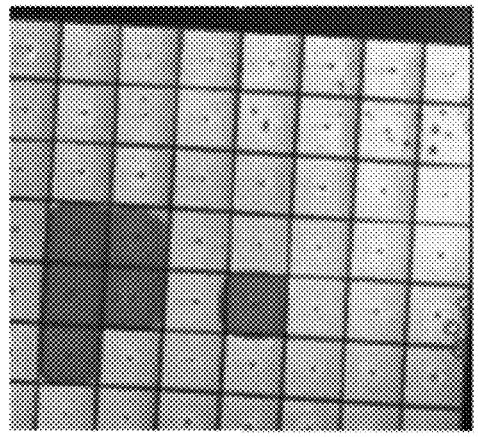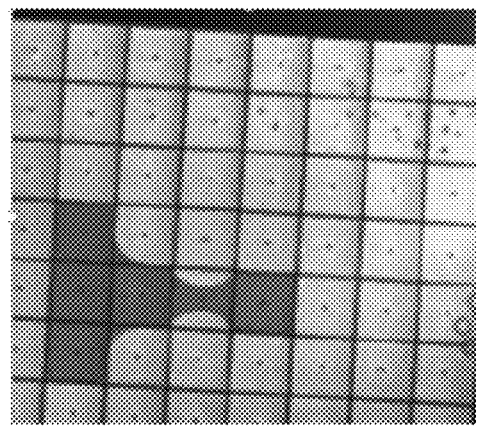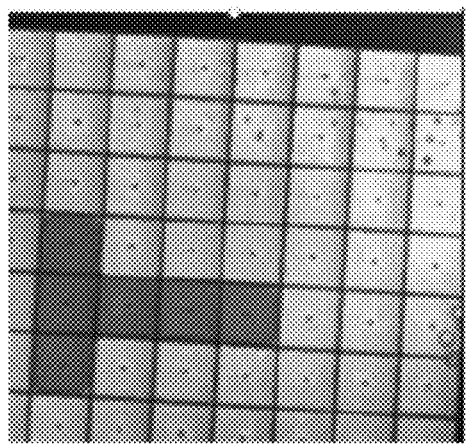
FIG. 7

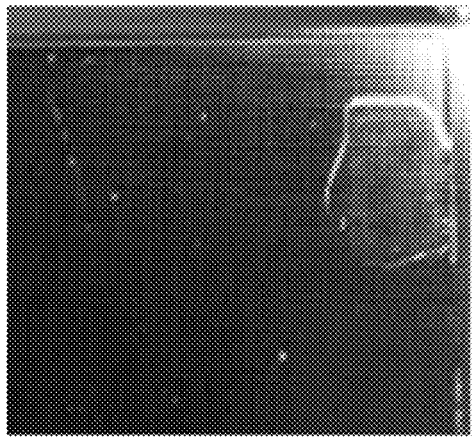
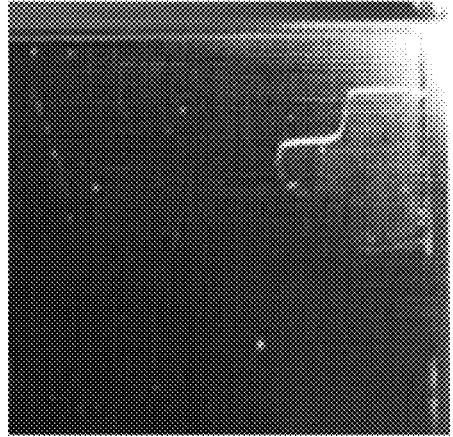
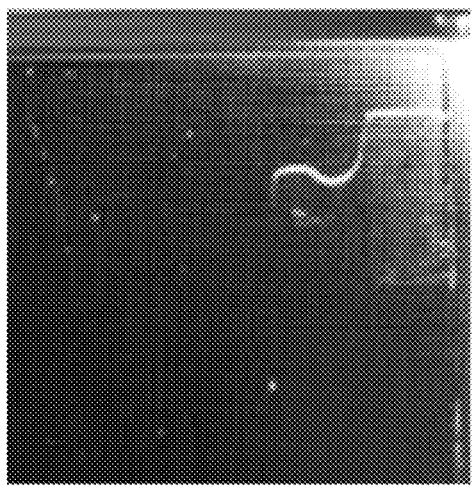
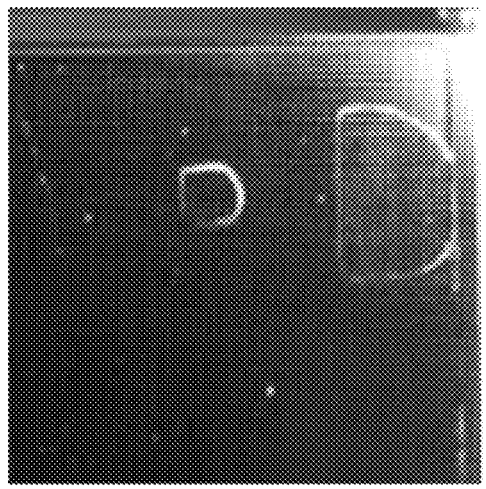
FIG. 8

After 4 hours bubbling and stringing observed complete failure after 6 hours 1        2
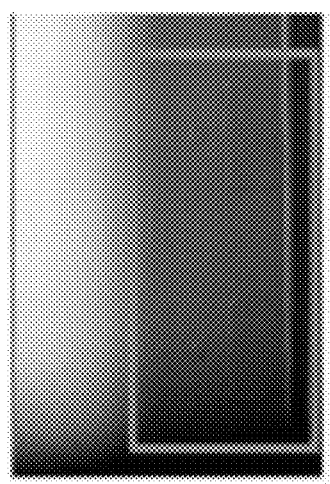 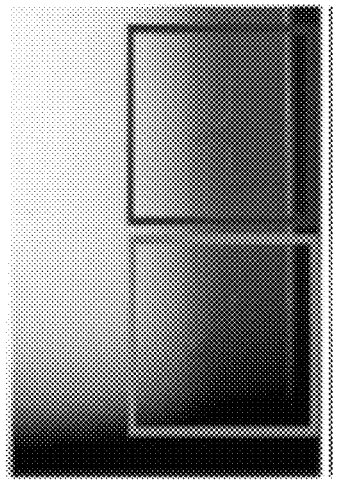
FIG. 14

METHOD FOR REAGENT-SPECIFIC DRIVING EWoD ARRAYS IN MICROFLUIDIC SYSTEMS

CROSS-REFERENCE TO RELATED PATENT APPLICATIONS

This application claims priority to U.S. Provisional Application No. 63/089,066 filed on Oct. 8, 2020, the entire content of which is hereby incorporated by reference in its entirety.

BACKGROUND

Digital microfluidic (DMF) devices use independent electrodes to propel, split, and join droplets in a confined environment, thereby providing a "lab-on-a-chip." Digital microfluidic devices have been used to actuate a wide range of volumes (nanoliter nL to microliter μL) and are alternatively referred to as electrowetting on dielectric, or "EWoD," to further differentiate the method from competing microfluidic systems that rely on electrophoretic flow and/or micropumps. In electrowetting, a continuous or pulsed electrical signal is applied to a droplet, leading to switching of its contact angle. Liquids capable of electrowetting a hydrophobic surface typically include a polar solvent, such as water or an ionic liquid, and often feature ionic species, as is the case for aqueous solutions of electrolytes. A 2012 review of the electrowetting technology was provided by Wheeler in "Digital Microfluidics," Annu. Rev. Anal. Chem. 2012, 5:413-40. The technique allows sample preparation, assays, and synthetic chemistry to be performed with tiny quantities of both samples and reagents.

There are two main architectures of EWoD digital microfluidic devices, i.e., open and closed systems. Often, both EWoD configurations include a bottom plate featuring a stack of propulsion electrodes, an insulator dielectric layer, and a hydrophobic layer providing a working surface. However, closed systems also feature a top plate parallel to the bottom plate and including a top electrode serving as common counter electrode to all the propulsion electrodes. The top and bottom plates are provided in a spaced relationship defining a microfluidic region to permit droplet motion within the microfluidic region under application of propulsion voltages between the bottom electrode array and the top electrode. A droplet is placed on the working surface, and the electrodes, once actuated, can cause the droplet to deform and wet or de-wet from the surface depending on the applied voltage. When the electrode matrix of the device is being driven, each pixel of the DMF receives a voltage pulse (i.e., a voltage differential between the two electrodes associated with that pixel) or temporal series of voltage pulses (i.e., a "waveform" or "drive sequence" or "driving sequence") in order to effect a transition from one electrowetting state of the pixel to another.

Most of the literature reports on EWoD involve so-called "segmented" devices, whereby ten to several hundred electrodes are directly driven with a controller. While segmented devices are easy to fabricate, the number of electrodes is limited by space and driving constraints and the devices need to be designed for specific applications. Accordingly, it may prove relatively problematic to perform massive parallel assays, reactions, etc. in segmented devices. In comparison, "active matrix" devices (a.k.a. active matrix EWoD, a.k.a. AM-EWoD) devices can have many thousands, hundreds of thousands or even millions of addressable electrodes and provide a general purpose panel that can be used for many different applications.

The electrodes of an AM-EWoD are often switched by a transistor matrix, such as thin-film transistors (TFTs), although electro-mechanical switches may also be used. TFT-based thin film electronics may be used to control the addressing of voltage pulses to an EWoD array by using circuit arrangements very similar to those employed in AM display technologies. TFT arrays are highly desirable for this application, due to having thousands of addressable pixels, thereby allowing mass parallelization of droplet procedures. Driver circuits can be integrated onto the AM-EWoD array substrate, and TFT-based electronics are well suited to the AM-EWoD application.

SUMMARY OF INVENTION

In one embodiment, there is provided an electrowetting system for actuating droplets of a first composition and droplets of a second composition. The system includes: a plurality of electrodes configured to manipulate droplets of fluid in a microfluidic space, wherein each electrode is coupled to circuitry configured to selectively apply driving voltages to the electrode; and a processing unit operably connected to a storage medium, which may include a look up table (LUT) correlating drive sequences to chemical species and at least one composition parameter. The processing unit is configured or programmed to: receive input data of a first chemical species and a first composition parameter of the first composition; receive input data of a second chemical species and a second composition parameter of the second composition; correlate a first drive sequence with the first chemical species and the first composition parameter; correlate a second drive sequence with the second chemical species and the second composition parameter; and output the first drive sequence and the second drive sequence to the plurality of electrodes.

In another embodiment, there is provided a method for performing droplet operations on a first composition and a second composition in an electrowetting system. The electrowetting system comprises: a plurality of electrodes configured to manipulate droplets of fluid in a microfluidic space, wherein each electrode is coupled to circuitry configured to selectively apply driving voltages to the electrode; and a processing unit operably connected to a storage medium, which may include a look up table (LUT) correlating drive sequences to chemical species and composition parameters. The method comprises: receiving input data of a first chemical species and a first composition parameter of the first composition; receiving input data of a second chemical species and a second composition parameter of the second composition; correlating a first drive sequence with the first chemical species and first composition parameter of the first composition; correlating a second drive sequence with the second chemical species and second composition parameter of the second composition; and outputting the first drive sequence and the second drive sequence to the plurality of electrodes.

In another embodiment, there is provided an electrowetting system for actuating a mixed droplet, the system including: a plurality of electrodes configured to manipulate droplets of fluid in a microfluidic space, wherein each electrode is coupled to circuitry configured to selectively applying driving voltages to the electrode; and a processing unit operably connected to a look up table (LUT) correlating drive sequences to chemical species and at least one composition parameter. The processing unit is configured or programmed to: provide a first droplet with a first composition, a first volume, and a first composition parameter, wherein at least one of the first composition, first volume, and first composition parameter is correlated with a first drive sequence for the electrowetting system; provide a second droplet with a second composition, a second volume, and a second composition parameter, wherein at least one of the second composition, second volume, and second composition parameter is correlated with a second drive sequence for the electrowetting system; mix the first droplet and the second droplet to create a mixed droplet; and drive the mixed droplet with a third drive sequence that is a predetermined weighted average of the first drive sequence and the second drive sequence.

In another embodiment, there is provided an electrowetting system for actuating droplets of at least one composition, the system including: a plurality of electrodes configured to manipulate droplets of fluid in a microfluidic space, wherein each electrode is coupled to circuitry configured to selectively apply driving voltages to the electrode; and a processing unit operably connected to a look up table (LUT) correlating drive sequences to chemical species and at least one composition parameter, the processing unit being configured or programmed to: receive input data of a chemical species and a composition parameter of the at least one composition; correlate a drive sequence with the chemical species and the composition parameter; and output the drive sequence to the plurality of electrodes.

In another embodiment, there is provided an electrowetting system for actuating droplets of at least one composition, the system including: a plurality of electrodes configured to manipulate droplets of fluid in a microfluidic space, wherein each electrode is coupled to circuitry configured to selectively apply driving voltages to the electrode; and a processing unit operably connected to a storage medium, which may include a look up table (LUT) correlating drive sequences to composition identifying data, the processing unit being configured to: receive input data identifying the at least one composition; correlate a drive sequence with the data identifying the at least one composition; and output the drive sequence to the plurality of electrodes, to actuate a droplet of the at least one composition.

BRIEF DESCRIPTION OF DRAWINGS

FIG. 3C is an exemplary set of drive sequences each specifically suited to a class of droplet composition.

FIG. 7 shows a simple three-pixel neck actuated off a reservoir to cleave off a droplet.

FIG. 8 shows the formation of a neck two droplet diameters in length in order to successfully break off the droplet.

FIG. 14 is a top view of the DMF device of FIGS. 13A-13E after testing two different dispensing schemes.

DEFINITIONS

Figure 1A:
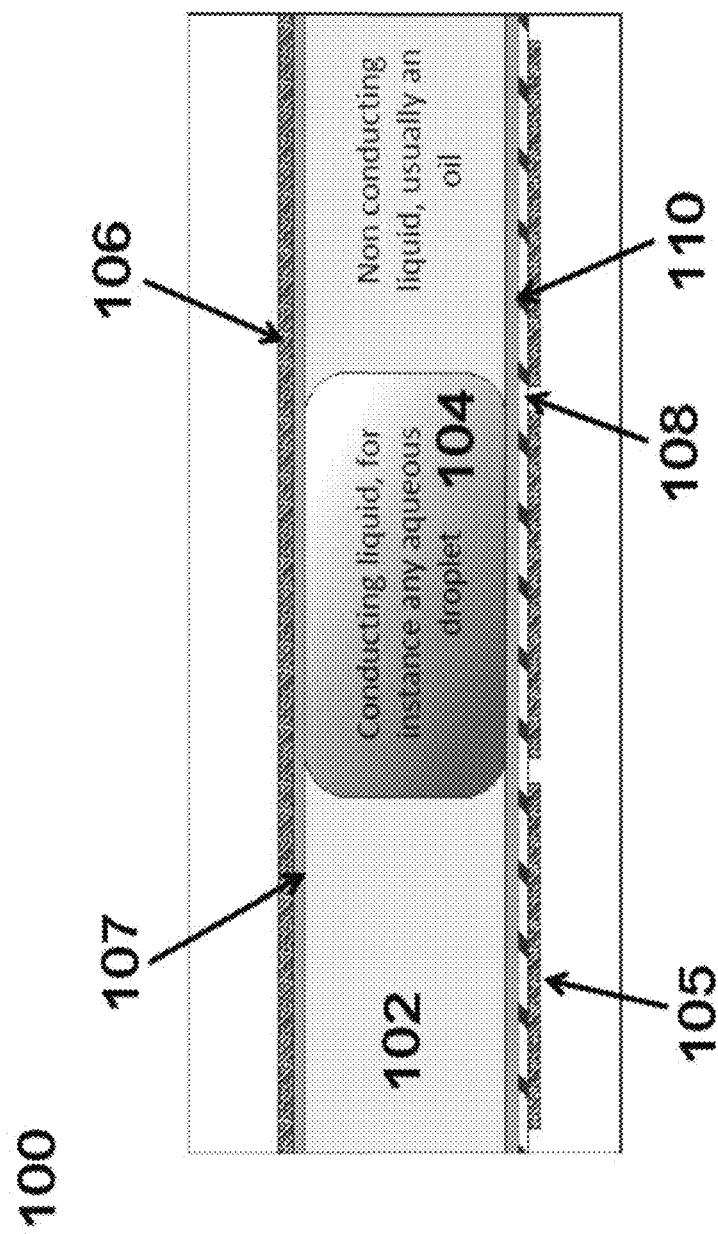
FIG. 1A is a diagrammatic cross-section of the cell of an example EWoD device.

Unless otherwise noted, the following terms have the meanings indicated.

"Actuate" or "activate" with reference to one or more electrodes means effecting a change in the electrical state of the one or more electrodes which, in the presence of a droplet, results in a manipulation of the droplet. Activation of an electrode can be accomplished using alternating current (AC) or direct current (DC). Where an AC signal is used, any suitable frequency may be employed.

"Droplet" means a volume of liquid that electrowets a hydrophobic surface and is at least partially bounded by carrier fluid and/or, in some instances, a gas or gaseous mixture such as ambient air. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include typical polar fluids such as water, as is the case for aqueous or non-aqueous compositions, or may be mixtures or emulsions including aqueous and non-aqueous components. Droplets may also include dispersions and suspensions, for example magnetic beads in an aqueous solvent. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes. In further examples, the droplet contents may include reagents for peptide and protein production, for example by chemical synthesis, expression in living organisms such as bacteria or yeast cells or by the use of biological machinery in in vitro systems.

The terms "DMF device", "EWoD device", and "Droplet actuator" mean a device for manipulating droplets. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. Patent Pub. No. 20060194331, entitled "Apparatuses and Methods for Manipulating Droplets on a Printed Circuit Board," published on Aug. 31, 2006; Pollack et al., International Patent Pub. No. WO/2007/120241, entitled "Droplet-Based Biochemistry," published on Oct. 25, 2007; Shenderov, U.S. Pat. No. 6,773,566, entitled "Electrostatic Actuators for Microfluidics and Methods for Using Same," issued on Aug. 10, 2004; Shenderov, U.S. Pat. No. 6,565,727, entitled "Actuators for Microfluidics Without Moving Parts," issued on May 20, 2003; Kim et al., U.S. Patent Pub. No. 20030205632, entitled "Electrowetting-driven Micropumping," published on Nov. 6, 2003; Kim et al., U.S. Patent Pub. No. 20060164490, entitled "Method and Apparatus for Promoting the Complete Transfer of Liquid Drops from a Nozzle," published on Jul. 27, 2006; Kim et al., U.S. Patent Pub. No. 20070023292, entitled "Small Object Moving on Printed Circuit Board," published on Feb. 1, 2007; Shah et al., U.S. Patent Pub. No. 20090283407, entitled "Method for Using Magnetic Particles in Droplet Microfluidics," published on Nov. 19, 2009; Kim et al., U.S. Patent Pub. No. 20100096266, entitled "Method and Apparatus for Real-time Feedback Control of Electrical Manipulation of Droplets on Chip," published on Apr. 22, 2010; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker et al., U.S. Pat. No. 7,641,779, entitled "Method and Apparatus for Programmable Fluidic Processing," issued on Jan. 5, 2010; Becker et al., U.S. Pat. No. 6,977,033, entitled "Method and Apparatus for Programmable Fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, U.S. Patent Pub. No. 20110048951, entitled "Digital Microfluidics Based Apparatus for Heat-exchanging Chemical Processes," published on Mar. 3, 2011; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Microcatenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between Two or Several Solid Substrates," published on Aug. 18, 2005; and Dhindsa et al., "Virtual Electrowetting Channels: Electronic Liquid Transport with Continuous Channel Functionality," Lab Chip, 10:832-836(2010).

"Droplet operation" means any manipulation of one or more droplets on a microfluidic device. A droplet operation may, for example, include: loading a droplet into the DMF device; dispensing one or more droplets from a source reservoir; splitting, separating or dividing a droplet into two or more droplets; moving a droplet from one location to another in any direction; merging or combining two or more droplets into a single droplet; diluting a droplet; mixing a droplet; agitating a droplet; deforming a droplet; holding a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations includes but is not limited to microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

"Gate driver" is a device directing a high-current drive input for the gate of a high-power transistor such as a TFT coupled to an EWoD pixel electrode. "Source driver" is a device directing a high-current drive input for the source of a high-power transistor. "Top plane common electrode driver" is a power amplifier producing a high-current drive input for the top plane electrode of an EWoD device.

"Drive sequence" or "pulse sequence" denotes the entire voltage against time curve used to actuate a pixel in a microfluidic device. Typically, as illustrated below, such a sequence will comprise a plurality of elements; where these elements are essentially rectangular (i.e., where a given element comprises application of a constant voltage for a period of time), the elements may be called "voltage pulses" or "drive pulses". The term "drive scheme" denotes a set of one or more drive sequences sufficient to effect one or more manipulations on one or more droplets in the course of a given droplet operation. The term "frame" denotes a single update of all the pixel rows in a microfluidic device.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over an electrode, array, matrix, or surface, such liquid could be either in direct contact with the electrode/array/matrix/surface, or could be in contact with one or more layers or films that are interposed between the liquid and the electrode/array/matrix/surface.

When a droplet is described as being "in", "on", or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

"Each," when used in reference to a plurality of items, is intended to identify an individual item in the collection but does not necessarily refer to every item in the collection. Exceptions can occur if explicit disclosure or context clearly dictates otherwise.

DETAILED DESCRIPTION

In one aspect, the present application relates to novel, adaptable EWoD devices which are programmed to individually tailor their drive schemes to different droplet contents and other variables. Also provided are programmable processing and control units for operating the devices. From an operational standpoint, the data processing steps associated with this novel approach usually include: (i) determining which pixels are occupied by droplets; (ii) ascertaining which composition of matter occupies the area of one or more pixels, and (iii) what types of pulse sequences, if any, are to be applied to the droplets. As such, the voltage and duration of each driving pulse may be chosen on the basis of variables including droplet composition, droplet location on the array, and the operation to be performed. The ability to adjust the way a droplet is handled to suit a variety of chemical and biological reagents and products enables the device to bring to completion each desired droplet operation. In various embodiments, the invention is applicable to either open or closed architectures and may be implemented in segmented and active matrix devices alike, including but not only AM-EWoD systems where the transistors of the matrix are TFT. In one embodiment, the device is used to perform a number of different chemical or biological assays and is provided with access to memory storing programmable instructions specifically suited to each of the reagent compositions used in each of the assays.

Gate Line Addressing

FIG. 1A shows a diagrammatic cross-section of the cell in an example traditional closed electrowetting on dielectric EWoD device 100 where droplet 104 is surrounded on the sides by carrier fluid 102 and sandwiched between top hydrophobic layer 107 and bottom hydrophobic layer 110. Propulsion electrodes 105 can be directly driven or switched by transistor arrays 108 arranged to be driven with data (source) and gate (select) lines, much like an active matrix in liquid crystal displays (LCDs) and organic light emitting diodes (OLEDs), resulting in what is known as active matrix (AM) electrowetting on dielectric EWoD. Typical cell spacing is usually in the range of about 50 microns (μm) to about 500 μm.

Figure 1B:
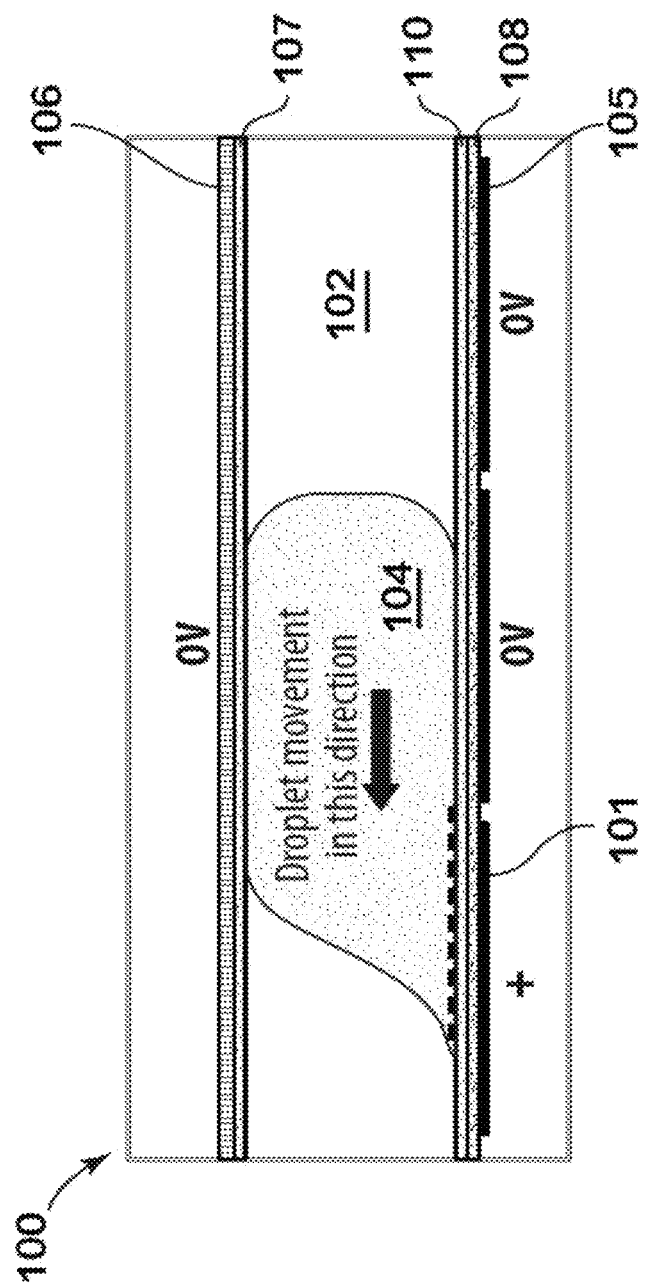
FIG. 1B illustrates EWoD operation with DC Top Plane.
Figure 1C:
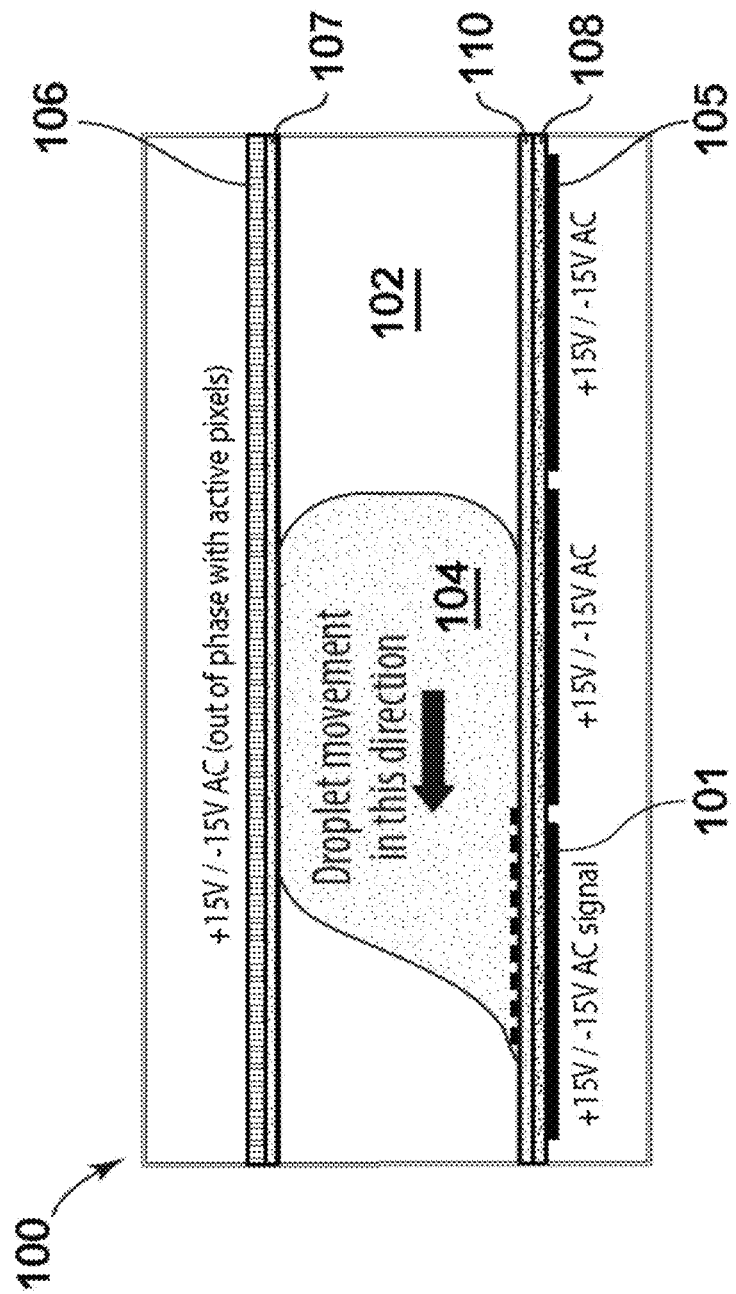
FIG. 1C illustrates EWoD operation with top plane switching (TPS).

There are two main modes of driving closed system EWoDs: "DC Top Plane" and "Top Plane Switching (TPS)". FIG. 1B illustrates EWOD operation in DC Top Plane mode, where the top plane electrode 106 is set to a potential of zero volts, for example by grounding. As a result, the potential applied across the cell is the voltage on the active pixel, that is, pixel 101 having a different voltage to the top plane so that conductive droplets are attracted to the electrode. In active matrix TFT devices, this limits pixel driving voltages in the EWOD cell to about ±15 V because in commonly used amorphous silicon (a-Si) TFTs the maximum voltage is in the range from about 15 V to about 20 V due to TFT electrical instabilities under high voltage operation. FIG. 1C shows driving the cell with TPS, in which case the driving voltage is doubled to ±30 V by powering the top electrode out of phase with active pixels, such that the top plane voltage is additional to the voltage supplied by the TFT. The device additionally includes a dielectric layer 108 between the pixel electrodes 105 and the top hydrophobic layer 107.

Figure 1D:
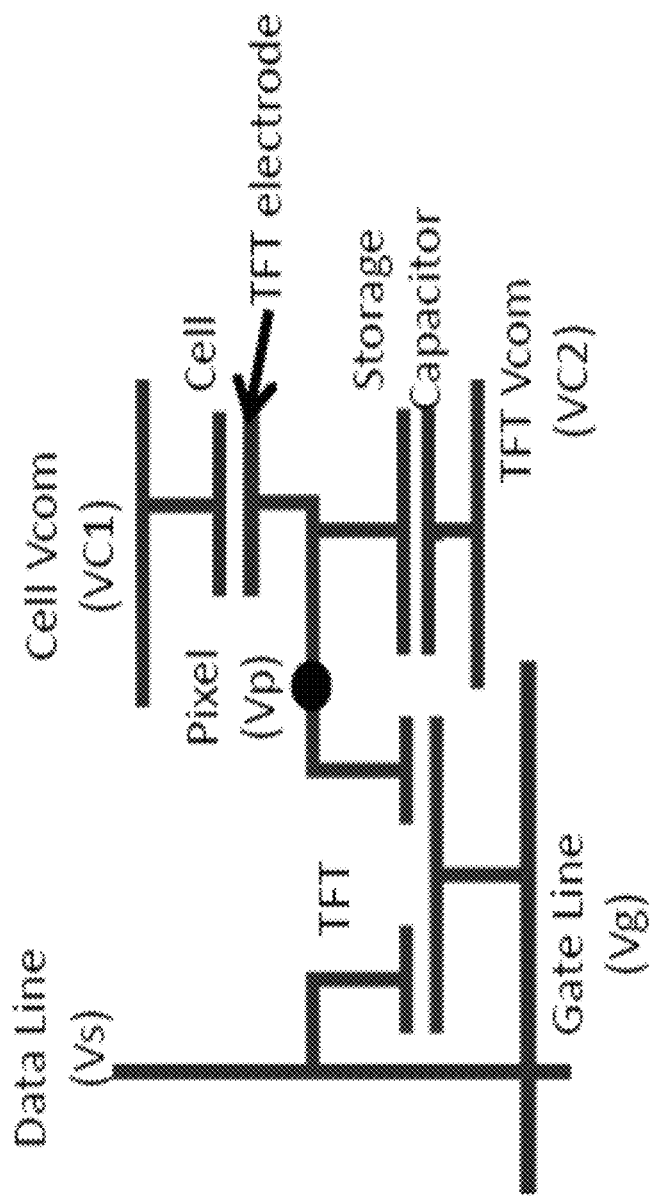
FIG. 1D is a schematic diagram of a TFT connected to a gate line, a source line, and a propulsion electrode.

Amorphous silicon TFT plates usually have only one transistor per pixel, although configurations having two or more transistors are also contemplated. As illustrated in in FIG. 1D, the transistor is connected to a gate line, a source line (also known as "data line"), and a propulsion electrode. When there is large enough positive voltage on the TFT gate then there is low impedance between the source line and pixel (Vg "ON"), so the voltage on the source line is transferred to the electrode of the pixel. When there is a negative voltage on the TFT gate then the TFT is high impedance and voltage is stored on the pixel storage capacitor and not affected by the voltage on the source line as the other pixels are addressed (Vg "OFF"). If no movement is needed, or if a droplet is meant to move away from a propulsion electrode, then 0 V, that is, no voltage differential relative to the top plate, is present on the pixel electrode. Ideally, the TFT should act as a digital switch. In practice, there is still a certain amount of resistance when the TFT is in the "ON" setting, so the pixel takes time to charge. Additionally, voltage can leak from Vs to Vp when the TFT is in the "OFF" setting, causing cross-talk. Increasing the capacitance of the storage capacitor $C_s$ reduces cross-talk, but at the cost of rendering the pixels harder to charge.

The drivers of a TFT array receive instructions relating to droplet operations from a processing unit. The processing unit may be, for example, a general purpose computer, special purpose computer, personal computer, or other programmable data processing apparatus providing processing capabilities, such as storing, interpreting, and/or executing software instructions, as well as controlling the overall operation of the device. The processing unit is coupled to a memory which includes programmable instructions to direct the processing unit to perform various operations, such as, but not limited to, providing the TFT drivers with input instructions directing them to generate electrode drive signals in accordance with embodiments herein. The memory may be physically located in the DMF device or in a computer or computer system which is interfaced to the device and hold programs and data that are part of a working set of one or more tasks being performed by the device. For example, the memory may store programmable instructions to carry out the drive schemes described in connection with a set of droplet operations. The processing unit executes the programmable instructions to generate control inputs that are delivered to the drivers to implement one or more drive schemes associated with a given droplet operation.

Figure 2:
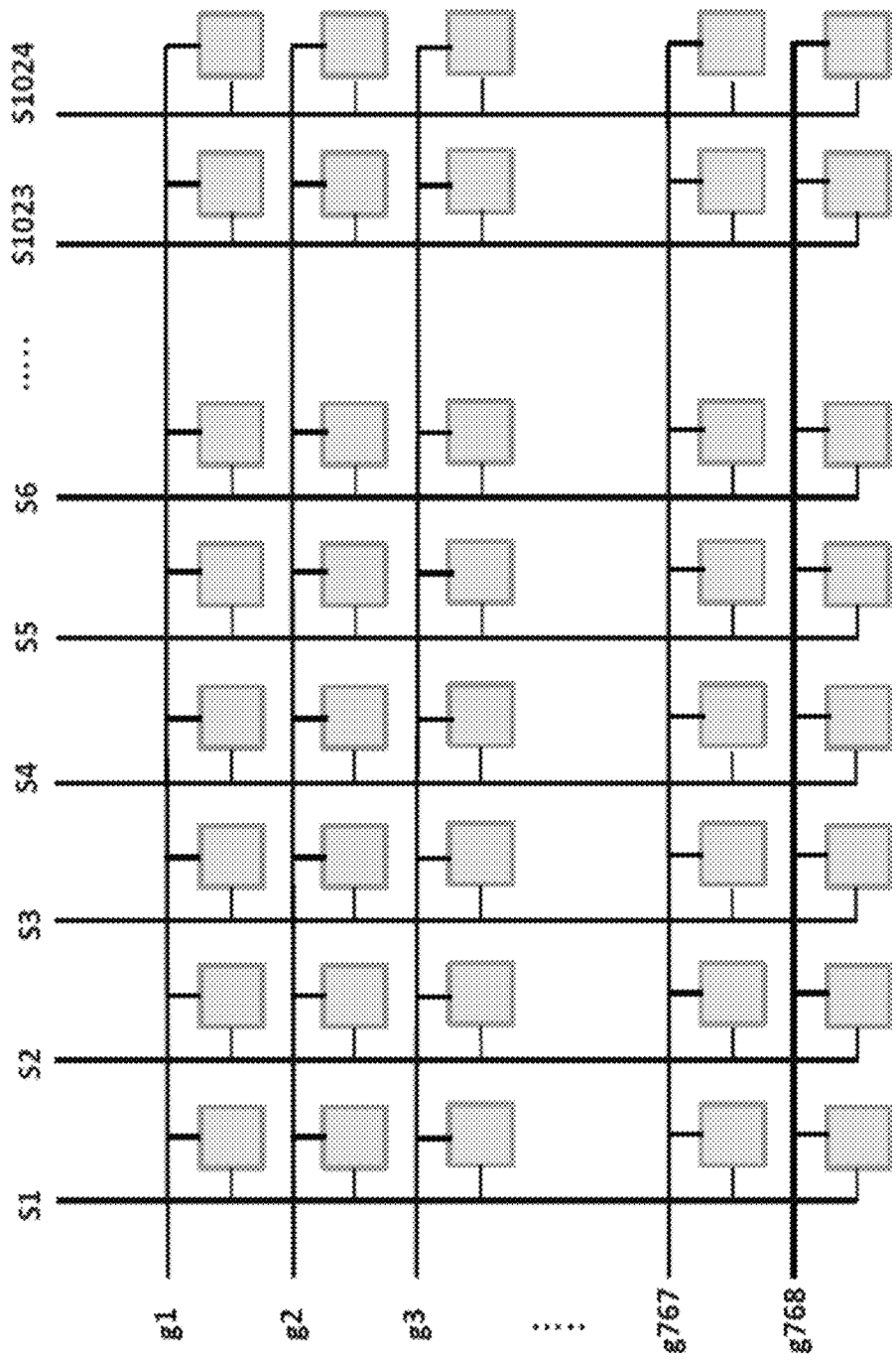
FIG. 2 is a schematic illustration of an exemplary TFT backplane controlling droplet operations in an AM-EWoD propulsion electrode array.

FIG. 2 is a diagrammatic view of an exemplary TFT backplane controlling droplet operations in an AM-EWoD propulsion electrode array. In this configuration, the elements of the EWoD device are arranged in the form of a matrix as defined by the source lines and the gate lines of the TFT array. The source line drivers provide the source levels corresponding to a droplet operation. The gate line drivers provide the signals for opening the transistor gates of electrodes which are to be actuated in the course of the operation. The figure shows the signals lines only for those data lines and gate lines shown in the figure. The gate line drivers may be integrated in a single integrated circuit. Similarly, the data line drivers may be integrated in a single integrated circuit. The integrated circuit may include the complete gate and source driver assemblies together with a controller. Commercially available controller/driver chips include those commercialized by Ultrachip Inc. (San Jose, California), such as UC8152, a 480-channel gate/source programmable driver. The matrix of FIG. 2 is made of 1024 source lines and a total of 768 gate lines, although either number may change to suit the size and spatial resolution of the DMF device. Each element of the matrix contains a TFT of the type illustrated in FIG. 1D for controlling the potential of a corresponding pixel electrode, and each TFT is connected to one of the gate lines and one of the source lines.

Reagent-Specific Drive Profiles

As mentioned above, this application relates to adaptable DMF devices programmed to implement sets of drive schemes which are specifically tailored to individually suit one or more of any number of differing droplet compositions and composition parameters.

Figure 3A:
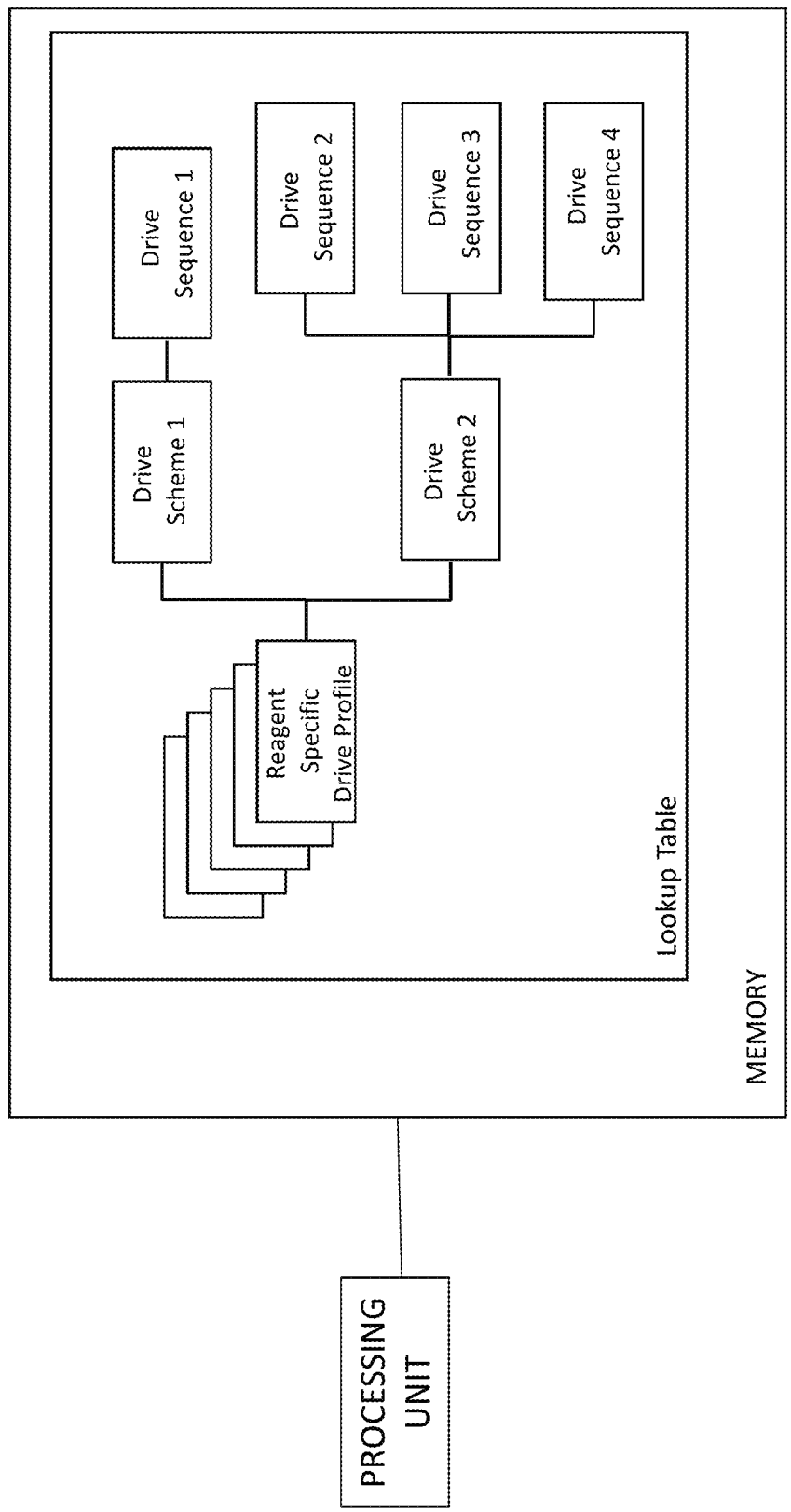
FIG. 3A is a diagram schematically illustrating a system for storing and retrieving any number of reagent-specific drive schemes.

FIG. 3A is a block diagram schematically illustrating an example system for storing reagent-specific drive schemes. The example system in FIG. 3A may be implemented in more detail with respect to FIG. 15. The processing unit is operatively coupled to a memory in which a searchable lookup table or other searchable data structure is held. The memory stores reagent-specific drive profiles are stored. The memory can also store programmable instructions executed by the processing unit to carry out operations described herein. Each profile includes one or more drive schemes which may be specifically tailored to the properties of a given reagent. More broadly, the term "reagent-specific drive profile" extends to profiles applicable to any composition manipulated in the DMF device, including a reagent at a particular concentration, a mixture of two or more reagents, and/or one or more reaction products. Included in the lookup table may also be one or more tuning functions or tables for adapting the drive schemes of a profile to suit the temperature of the DMF device or any of its parts, ambient humidity, and other extrinsic variables which may affect droplet operations. Other reagent-specific drive profiles may depend upon, e.g., the type of carrier fluid, the pH of the reagent, viscosity of the reagent, or the ionic concentration of the reagent.

The lookup table may be held in a file system or located in virtual memory associated with one or more computer systems and may be arranged in a variety of ways, such as physically located inside the computer system, directly attached to the CPU bus, attached to a peripheral bus, or located in a cloud-based storage platform that is operably connected to the computer system. For each new reagent, mixture, or product taking part in a droplet operation, a suitable reagent-specific profile is chosen from among those available within the table. A reagent-specific profile may include composition parameters such as pH, temperature, rheological properties such as viscosity, ionic strength, electrical conductivity, and absorbance at particular wavelengths, among other parameters relevant to the electrowetting response of the corresponding reagent. Prior to or at the beginning of a droplet operation, drive schemes from the profile or relevant portions thereof may be loaded into a temporary memory for subsequent use by the processing unit.

The mobility of a droplet in a microfluidic space is affected by parameters including but not limited to: reagent concentration in the droplet solvent, e.g. water, ionic strength, concentration and chemistry of surfactant additives, droplet rheology, reagent charge which in turn may be affected by the pH of the droplet, and temperature or temperature gradients within the device. Prior to reagent use, these and other properties may be measured for each reagent type and a determination made as to which drive profile, typically, will be best suited to a given reagent or mixture. Alternatively, droplets of the reagent may be directly tested on a DMF device by applying each of the available drive profiles until the profile with the acceptable performance (e.g., the best performance) is found and labelled with a code or other identifying data matching the profile to the reagent for future use. Thereafter, for all subsequent manipulations of the reagent in the DMF device, a user can specify which drive profile is to be used at a particular location in the device.

Figure 3B:
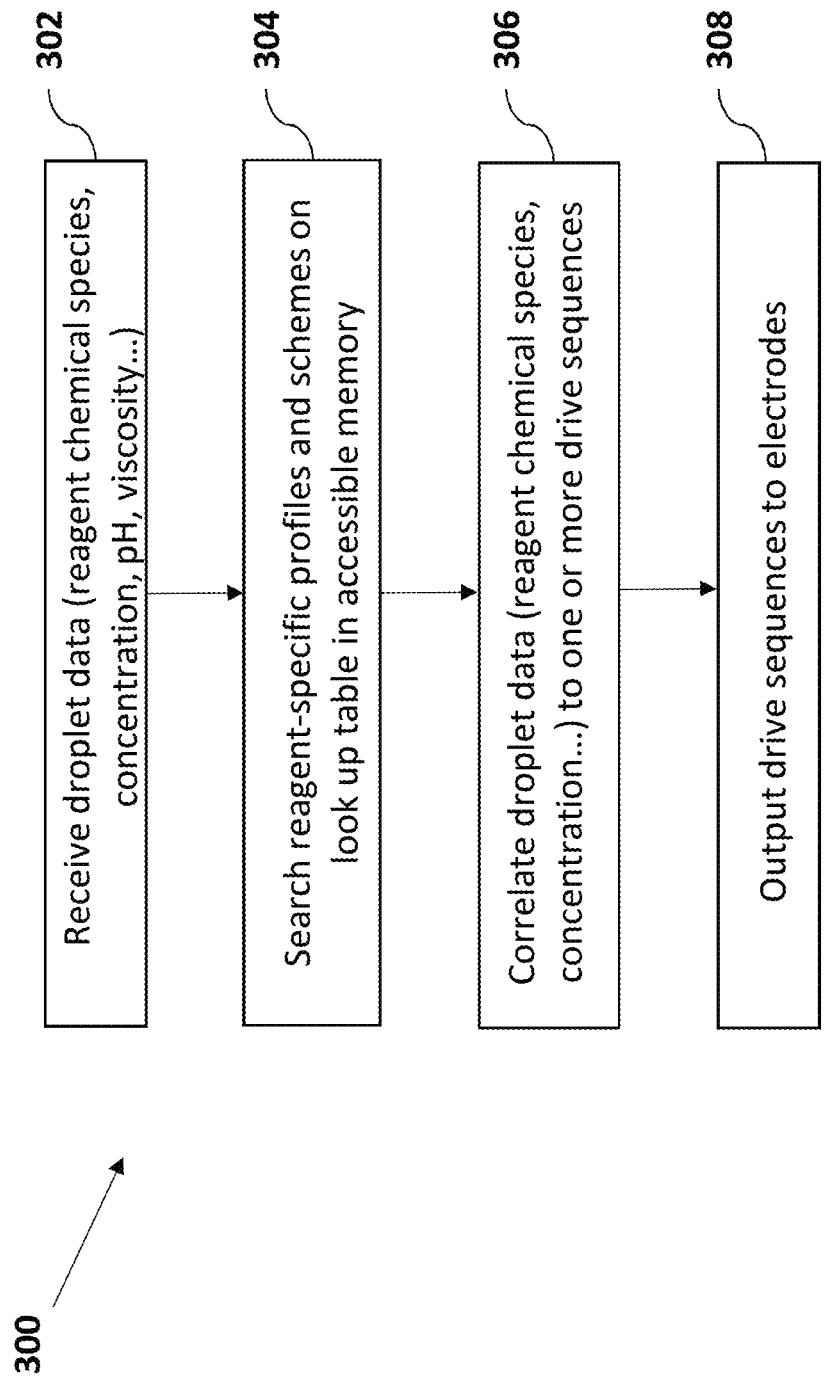
FIG. 3B is the flowchart of an exemplary method for correlating input droplet data to drive sequences to be output to DMF electrodes.

FIG. 3B is a flowchart illustrating an example method 300 for operating an electrowetting system with the sequence drives saved to the reagent-specific drive profiles. The method 300 can be performed using the processing unit of the electrowetting system. At block 302, the processing unit receives droplet data. For example, the processing unit receives data pertaining to the characteristics of a droplet to be actuated in the system. The data usually includes the identity of chemicals species contained in the droplet, e.g., one or more reagents delivered in the droplet, the respective concentrations of relevant chemical species, and/or other composition parameters related to a chemical species concentration or affecting droplet mobility and chemistry, for example pH, temperature, rheological properties such as viscosity, ionic strength, electrical conductivity, and absorbance at particular wavelengths. At block 304, the processing unit then searches reagent-specific profiles in the look up table. At block 306, the processing unit correlates relevant droplet data, such as which reagent chemical species it contains and their respective concentrations, to one or more drive sequences. At block 308, the processing unit outputs the drive sequences to the electrodes of the electrowetting system.

Droplets of each reagent may be actuated with drive sequences specifically suited to their characteristics. This novel capability is especially advantageous because implementing the same drive scheme for different chemical compositions may result in sub-optimal droplet actuation on one or more of the compositions. In addition, voltage ranges and impulse lengths suitable for one composition may induce undesired electrochemical reactions in another. This in turn may lead to further reactions leading to corrosion of the working surfaces of the DMF device. To take a representative example, as illustrated in FIG. 3C, Drive Scheme A performs satisfactorily when applied to a first Reagent 1 but leads to corrosion on the working surfaces when applied to a second Reagent 2. This problem is solved by driving droplets containing Reagent 2 with Scheme B having pulses of longer duration but lower voltage than Scheme A. In contrast, droplets containing a third Reagent 3 move slowly and sluggishly when actuated with either Scheme A or B. However, Scheme C, which is characterized by pulse sequences of higher voltages, is found to remedy this problem without upsetting the chemistry of Reagent 3 or causing corrosion.

In another, non-exclusive embodiment, a complete reagent drive profile is custom-made for each individual reagent type and added to the look up table. Each reagent is run through moving, splitting, dispensing, mixing and holding tests spanning a broad set of voltages, polarities, and pulse durations to identify drive schemes having pulse sequences best suited to that reagent. This customized reagent profile is then be added to the look up table and matched to one or more reagents by a code or other labelling item of information, to be called by the processing unit whenever that reagent is to be used on the DMF device. The number of reagent (and, as explained above, any mixtures of two or more reagents and/or products) profiles stored in the look up table would then be up to the number of reagents or mixtures that have reagent drive profiles determined therefor. A user may specify a code or other labeling item of information associated with which reagent is to be used at a particular location in the DMF device. In one embodiment, there is not a finite standard set of reagent profiles from which to choose the one best suited to a droplet. Instead, a specific reagent drive profile may generated individually for each new reagent.

For certain classes of droplet compositions, suitable drive profiles are already well-known and no data regarding chemical species or composition parameters are required for selecting appropriate drive sequences. A typical example is provided by standardized buffered aqueous solutions serving as solvents and other roles in biochemical or biomolecular applications, e.g., nucleic acid amplification, affinity-based assays, enzymatic assays, gene sequencing, protein sequencing, peptide and protein synthesis, and/or analyses of biological fluids, where the buffers are typical sourced in bulk from commercial providers. In such instances, more simple and expedited processing may be achieved by marking or labeling a standardized composition with a code or other identifying data matching the composition to a pre-selected drive profile in the look up table. When droplets of the standardized composition are to take part in a droplet operation, the processing unit correlates the identifying data to one or more drive sequences in the pre-selected drive profile. As the standardized composition and the drive profile have been already matched, there is no longer a need for the processing unit to search the look up table for drive profiles and select drive sequences fitting the chemical species and parameters of the standardized composition.

Figure 11:
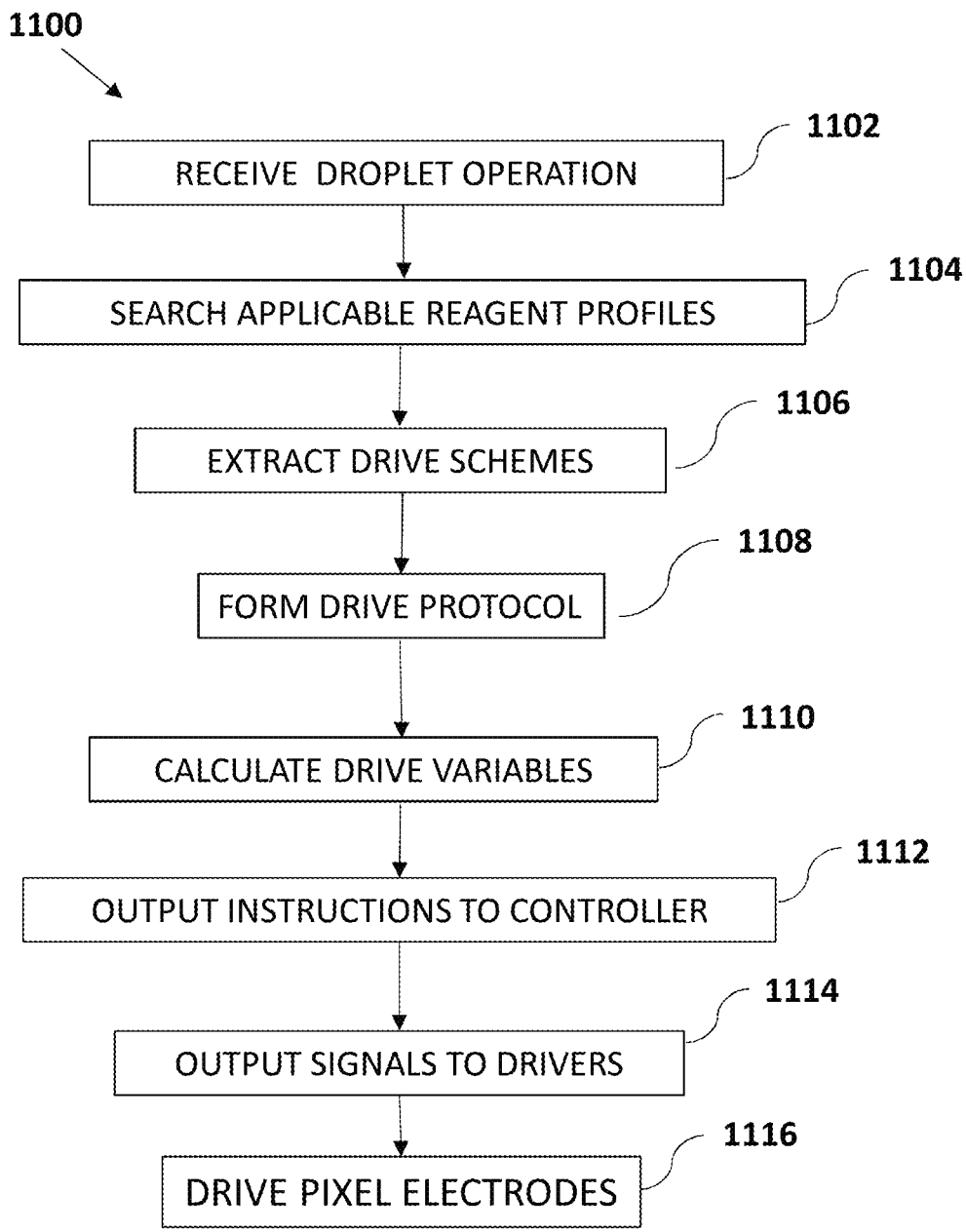
FIG. 11 includes the flow chart of a method of using drive profiles according to an exemplary embodiment.

FIG. 11 includes the flow chart (1100) of a method of using the drive profiles according to an exemplary embodiment. The method 1100 can be performed using an electrowetting system At block 1102, the processing unit of the electrowetting system receives a desired droplet operation (e.g., from a user input). At block 1104, the processing unit is programmed to search for and identify applicable reagent profiles in the look up table. At block 1106, the processing unit extracts drive schemes. For example, the processing unit is programmed to select from the profiles one or more drive schemes which are best-suited to the compositions, e.g., reagents, products, and/or mixtures, which are to be manipulated in the operation. At block 1108, the processing unit forms a drive protocol. For example, the processing unit combines the drive sequences of the schemes together to form a driving protocol that is executed to implement the droplet operation. At block 1110, the processing unit calculates drive variables. For example, the processing unit calculates drive variables relating to the drive sequences such as the polarity, frequency, and amplitude of each of the pulses of the corresponding voltage sequences are calculated). At block 1112, the processing unit outputs instructions to a controller. At block 1114, the controller of the electrowetting system outputs signals to the drivers At block 1116, the drivers of the electrowetting system drives pixel electrodes. For example, the drivers drive the pixel electrodes by affecting a voltage at particular pixel electrodes as a function of time.

Drive Schemes

A given droplet operation may require drive schemes of differing levels of complexity depending on the number of manipulations associated with that droplet operation. To this end, included in each reagent-specific drive profile of the look up table are a set of drive schemes to facilitate droplet operations. Typical droplet operations include those outlined above, namely: loading a droplet into the DMF device; dispensing one or more droplets from a reservoir; splitting, separating or dividing a droplet into two or more droplets; moving a droplet from one location to another in any direction; merging or combining two or more droplets into a single droplet; diluting a droplet; mixing a droplet; agitating a droplet; deforming a droplet; holding a droplet in position; incubating a droplet; heating a droplet; cooling a droplet; disposing of a droplet; transporting a droplet out of a DMF device; and/or any combination of the foregoing.

The data needed to define a set of drive sequences which are applied in the course of a given droplet operation is stored in the form of a drive scheme which is matched to the operation. A drive scheme may include any from just one to a large number of drive sequences, depending on the requirements and complexity of the operation. In some instances, it may be preferable to store multiple sets of drive sequence data to allow for variations in environmental variables such as temperature and humidity. Alternatively, a drive scheme may include tuning functions which are applied to change one or more coefficients defining its drive sequences to suit different environmental conditions.

According to a representative embodiment, there is provided an exemplary drive scheme, hereinafter referred to as "motion scheme", which is implemented in a DMF device for moving droplets of a given composition from one location to another. The scheme includes one or more drive sequences specifying the magnitude, duration, polarity, and other relevant characteristics of pulses that are applied to actuate composition droplets. Other relevant data may also be included in the scheme, for example the speed of movement of the pixels, meaning how quickly the applied voltage profile moves from one set of pixels currently occupied by the droplet to an adjacent set of pixels currently unoccupied by the droplet, where the droplet will move to next and how quickly to change the voltage on the trailing edge of the droplet to force the droplet off the previous location. For a drop of size matching a single pixel this is straightforward, i.e., activating the location to move toward and turning off the currently occupied pixel and other adjacent pixels. For drops having a footprint occupying multiple pixels, the variation in geometric pattern, number, and timing of pixels being turned on and off are all parameters that may be optimized to suit any type of droplet composition. In one representative example, a motion scheme for deionized water with a surfactant, for example 0.05 wt % TWEEN® 20, includes a simple 50 Hz square wave alternating pulse sequence at +/−30 V. The pulse sequence may be generated on a TFT array and top plane switching (TPS) to reverse the polarity.

The application of drive pulses to a pixel may result in deleterious side effects resulting from the accumulation of residual charge on the pixel surface which is apt to cause unwanted electrochemical reactions and/or surface and electrode degradation. One approach that may be taken for minimizing damage to the EWoD device involves ensuring that a given drive scheme is charge-neutral, in the sense that, for any arbitrary series of pulses in a drive scheme, the overall change in charge surface density is equal to zero. When the overall drive scheme of a droplet operation is charge-neutral, and even more when all drive sequences of the scheme are each individually charge-neutral, the chance for electrochemical damage to the pixel surface and the underlying electrodes is minimized.

Figure 4:
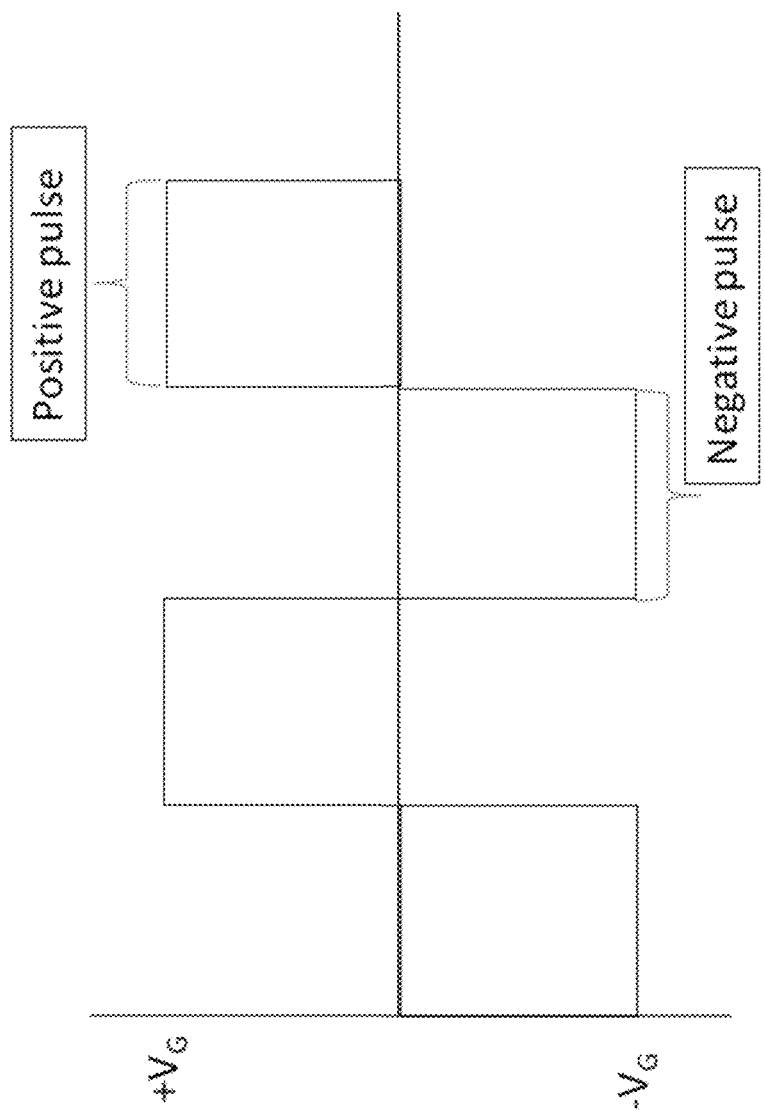
FIG. 4 illustrates a charge-neutral pulse sequence.

As a starting point and first approximation, charge neutrality may be attempted by ensuring that a given drive scheme is "impulse-balanced" in the sense that, for any arbitrary series of pulses in a drive sequence belonging to the scheme, the overall applied impulse (i.e., the integral of the applied voltage with respect to time) equals zero. This is exemplified in FIG. 4 where the number and duration of positive and negative pulses are equal. There are other ways to zero the impulse in the device where the number and duration of pulses may not be the same but the sum of the products of the voltage and duration for each positive pulse is equal to the same sum of products for the negative driving pulses. However, for many reagents, impulse-balanced pulses may not be charge-neutral in that they still leave residual charges on the surface due to asymmetric effects of positive- and negative-voltage pulses. In such instances, additional positive or negative correcting pulses beyond impulse balance may be applied to obtain charge balance on the surface. In a representative example, a first attempt is made by applying an impulse-balanced drive scheme followed by measuring the amount of residual surface charge by one of the methods known to those skilled in the art. If unacceptable surface charge densities are detected, corrective pulses may be added in further iterations until charge balance is reached, thereby creating an impulse-imbalanced, yet charge-neutral drive sequence. This approach ensures that the residual charge experienced by any pixel of the DMF device is null or at least bounded by a known value, regardless of the exact series of transitions undergone by that pixel.

Figure 5:
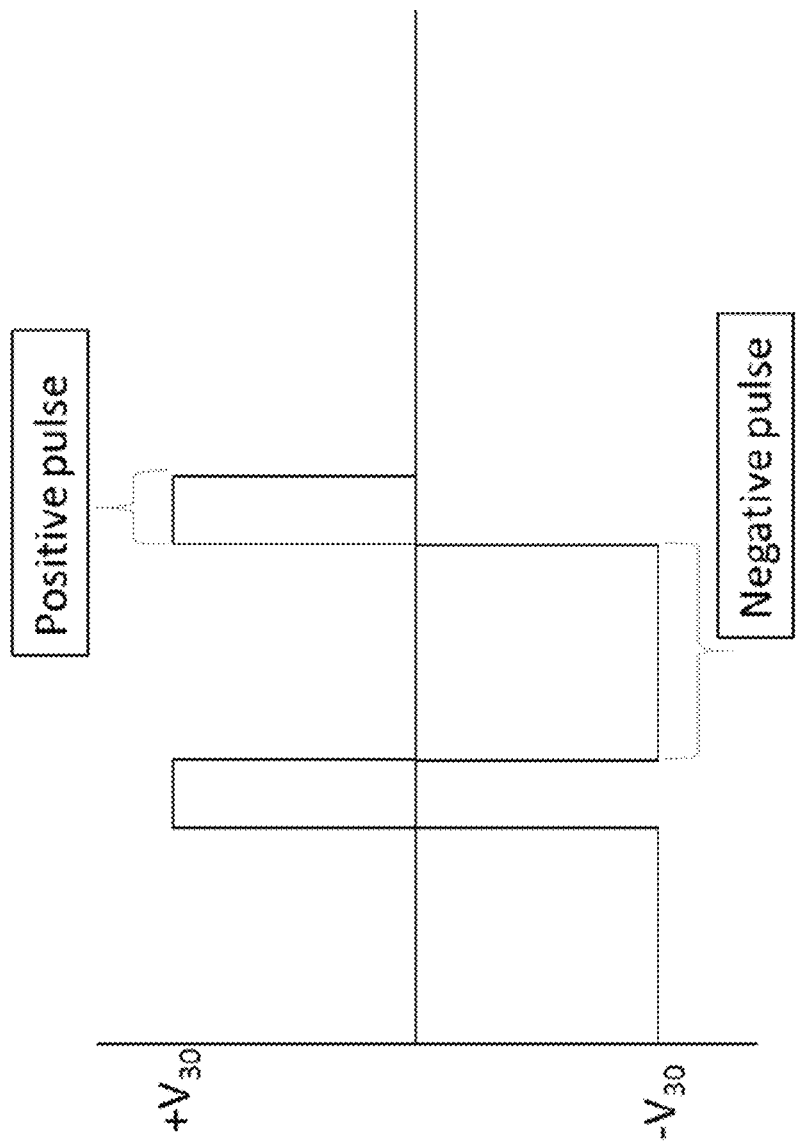
FIG. 5 illustrates a non-impulse-balanced pulse sequence.

It should also be noted that, for more complex reagents and reagent combinations, it may not be always possible to attain a desired droplet motion by applying fully impulse-balanced drive schemes or even single drive sequences. This may occur especially with aqueous mixtures containing enzymes, nucleic acid molecules like DNA or RNA polynucleotides, natural or synthetic polymeric materials, and colloids such as functionalized magnetic beads. For example, time-sensitive reaction profiles may require reagent droplets to change locations at speeds only attainable with pulse-imbalanced drive schemes or sequences. A drive sequence that would not be impulse-neutral after each pair of pulses is provided is known as "pulse width modulated" (PWM) repeating signal. In this example, the negative pulses are the same number as the positive pulses, but longer in duration. The net result over time imparts a negative impulse to the pixel surface, as illustrated in FIG. 5. In other embodiments, the PWM includes changing the balance of pulses and rests to change the effective impulse over time and may also change the net impulse balance if the frequency of pulses of one polarity is higher than the frequency of the other polarity.

Figure 6:
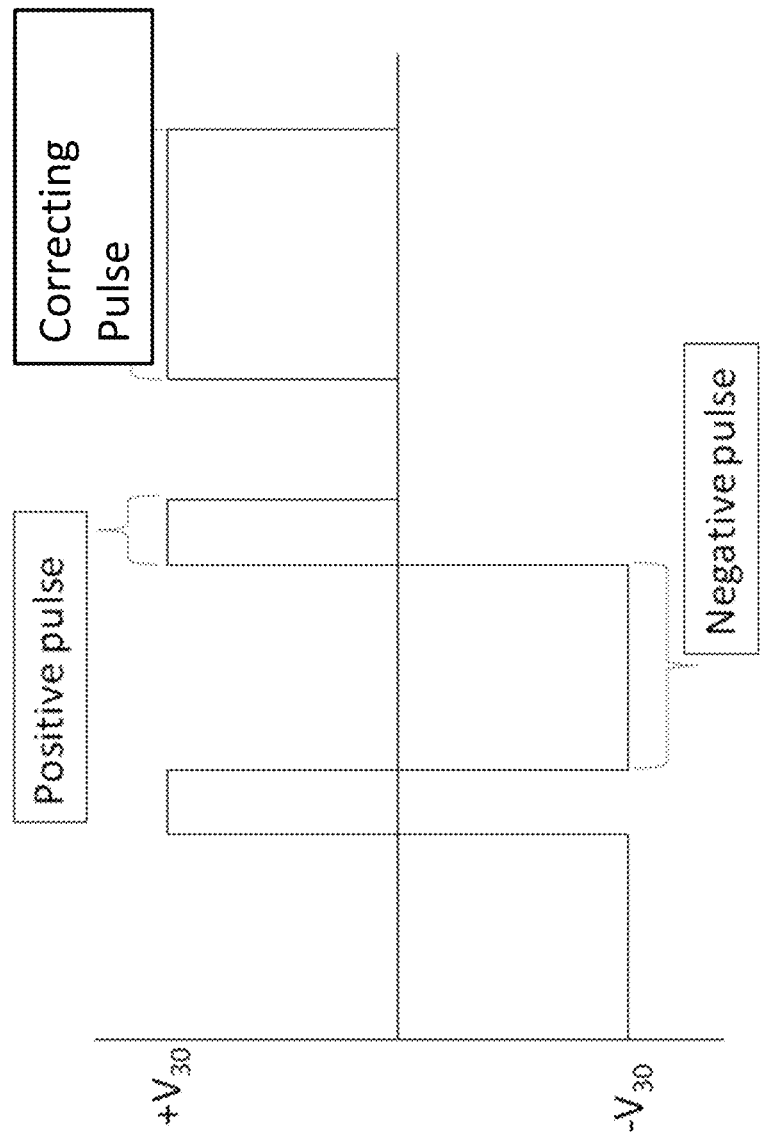
FIG. 6 illustrates a pulse sequence with a correcting, balancing pulse.

In instances where impulse imbalance is accompanied by undesired surface charge buildup, the disparity in pulse duration positive and negative will create a trade-off between enhanced movement for the reagent and the likelihood of electrochemical damage to the EWoD device. Depending on the magnitude of the residual charge over time, the device may sustain electrochemical damage that becomes irreversible. To solve or at least ameliorate this drawback, one or more charge-correcting pulses of the opposite polarity, sufficient to remove residual charge partially or fully, may be added to either the beginning of the drive sequence, before the droplet has started to move, or to the end of the sequence, after the droplet has been moved to the new location. This type of simple correcting pulse is shown in FIG. 6. After a drop has been moved to a location and the surrounding pixels have been turned off, almost any correcting pulse can be used and not move the droplet. As such, more complex sequences of correcting pulses can be used to create a charge-neutral pulse sequence, and pulses of different voltages can also serve as correcting tools.

In a further embodiment, another exemplary scheme, hereinafter referred to as "dispensing scheme", is provided for dispensing droplets of a desired reagent from a reservoir. This type of schemes are usually characterized by drive sequences of a more complex nature than the aforementioned motion schemes and may require additional information to be fully applicable to each reagent or reagent mixture. However, information on droplet mobility that is derived from motion schemes may still prove useful in selecting drive schemes best suited to dispensing droplets of the same or similar composition.

A dispensing scheme is applied to move reagent aliquots from a typically large reservoir volume to form an actuated neck. A droplet is cleaved off, and the fluid of the neck is returned to the reservoir. The length of the actuated neck needed before a drop can be successfully cleaved from the head of the neck may be reagent-dependent. The dispensing profile may specify actuated neck lengths expressed in terms of numbers of pixels and durations of time required to elapse before a droplet can be safely assumed to have fully separated from the reservoir. For the aforementioned droplets of water with TWEEN® 20 at a concentration of 0.05 wt %, a neck length of 3 pixels and a time interval of 500 ms are usually sufficient to cleave off the droplet.

FIG. 7 shows a simple three-pixel neck actuated off a reservoir by actuation of pixel electrodes in a PM-EWOD device. In direct drive configurations, the footprint of each droplet usually covers the area of one pixel. As such, the process of neck formation is controlled at a resolution of about one pixel diameter. This neck length allows a droplet to be cleaved off from the neck head on a segmented DMF device. Hence, it is simpler to measure the length of the actuated neck in terms of approximate number of droplet diameters. In the example shown in FIG. 8, a simple water with TWEEN® 20 surfactant at a concentration of 0.05 vol % is extended to form a neck on an AM-EWOD device having a TFT array. In a TFT-based architecture, the droplet can be much larger than a single pixel electrode, so there much more flexibility in shaping the neck. Different-sized necks may be required depending on the size of the droplet relative to the reservoirs, and other properties of the droplet (e.g., surface tension and viscosity). Accordingly, a TFT architecture typically affords the most flexibility in shaping and tuning the neck as compared to typical segmented/direct drive approaches.

The inclusion of polynucleotides or other polymeric materials has been found to usually render the droplets more difficult to cleave from the reservoir. This may be addressed by increasing actuated neck lengths and allowing for longer time intervals to ensure that the droplets have been fully cleaved.

In certain embodiments, there are provided "loading schemes" for instances where droplets may be directly drawn into the microfluidic space, rather than being cleaved from a reservoir. This is a common way of loading various materials onto the pixel array of a microfluidic device and usually requires pulse sequences which differ from those applied to move droplets between locations within the array. The droplets may be pulled into the microfluidic space from the edge of the array or from porting holes in the top plate. If a material is provided in a position physically touching the edge of the array, repeated pulsing of pixels at a location adjacent the edge may be applied to draw droplets over the array. Typically, the ability to load a reagent into the microfluidic space is strongly influenced by its chemical composition and some materials require longer pulses and higher voltages. As such, reagent-specific "loading schemes" can be specifically tailored to suit diverse reagent compositions.

According to a further embodiment, there is provided a "merging scheme", which may implemented for merging together two or more droplets. Included in this type of scheme are one or more drive sequences for moving droplets of different reagents within the microfluidic space as well as merging motion drive sequences for physically combining the droplets together. The merging of different reagents may result in product droplets having different mobility than the original droplets, so the merging scheme may be required to adapt to such changes in mobility. This may be achieved by including drive schemes which are specifically formulated and optimized for the contents of product droplets.

Figure 9:
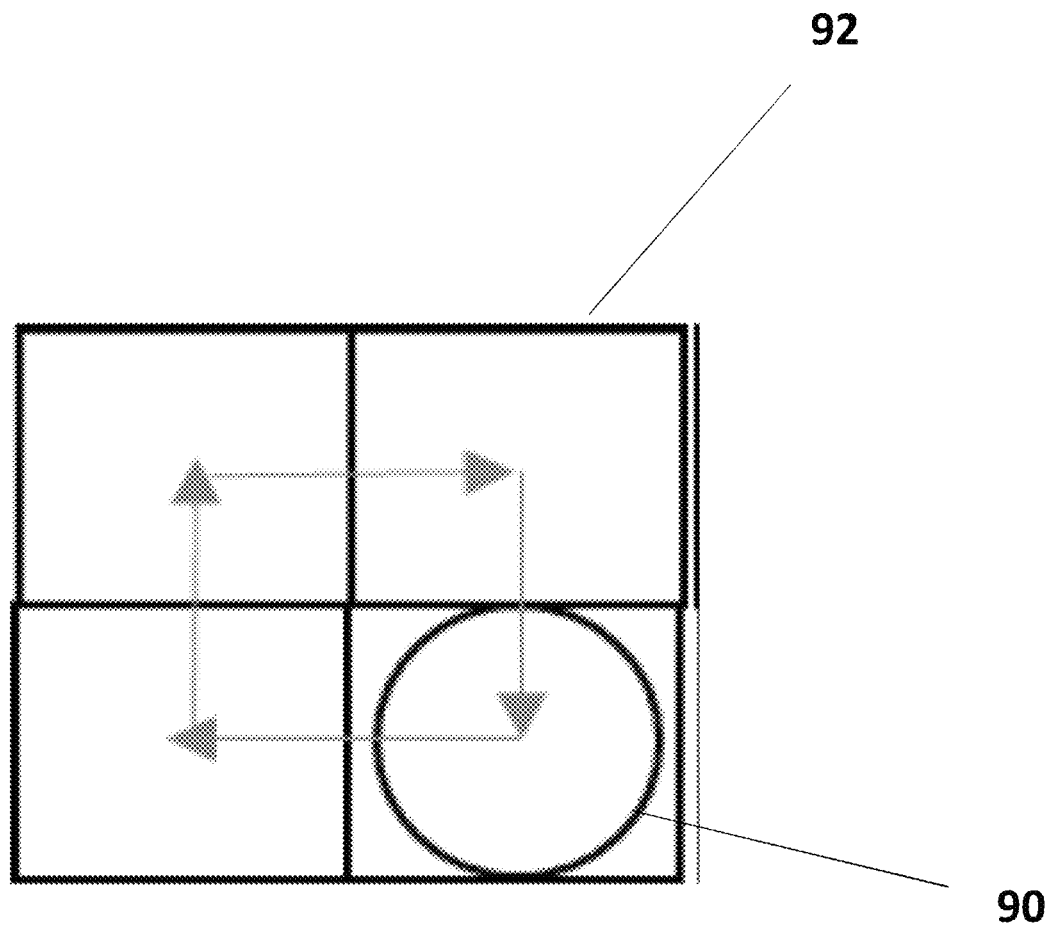
FIG. 9 schematically illustrates a droplet mixing pattern.

Following the merger of two or more reactant droplets, homogenous distribution of one or more components within the product droplet may be attained by applying the drive sequences of what is hereinafter referred as a "mixing scheme". The physical mixing of droplets is usually dependent on the reagents contained in the droplets. Variables such as the number of repetitions of the mixing motion pattern, time of mixing, and the elongation of the drops during mixing may be changed to accommodate various reagents. At one easy-to-mix extreme, merging two droplets of the same reagent may require no mixing scheme at all, no additional time for diffusion, and no elongation of the droplets to cause mixing; at the other extreme, two drops containing solutions of distinct, high molecular weight polymers are likely to require repeated execution of the mixing motion pattern, a long mixing time, and multiple elongations of droplets produced by the mixing. For example, the mixing scheme schematically illustrated in FIG. 9 includes two repetitions of a mixing motion pattern whereby a product droplet 90 is subsequently moved to each of the four corners of a square 92 having a diameter approximately twice the length of the droplet diameter.

Figure 10B:
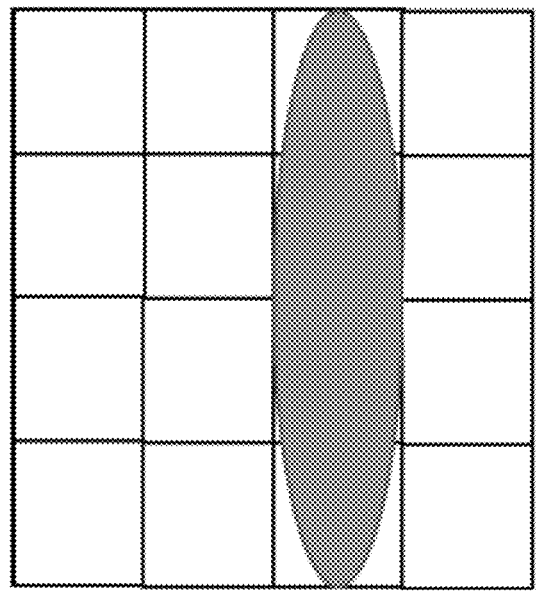
FIG. 10B shows the droplet of FIG. 10A after an elongating drive sequence is applied.
Figure 10A:
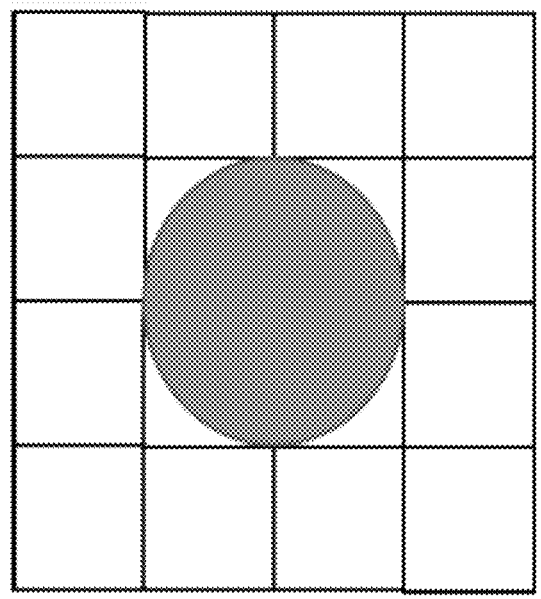
FIG. 10A shows the first step of a droplet mixing pattern.
Figure 10C:
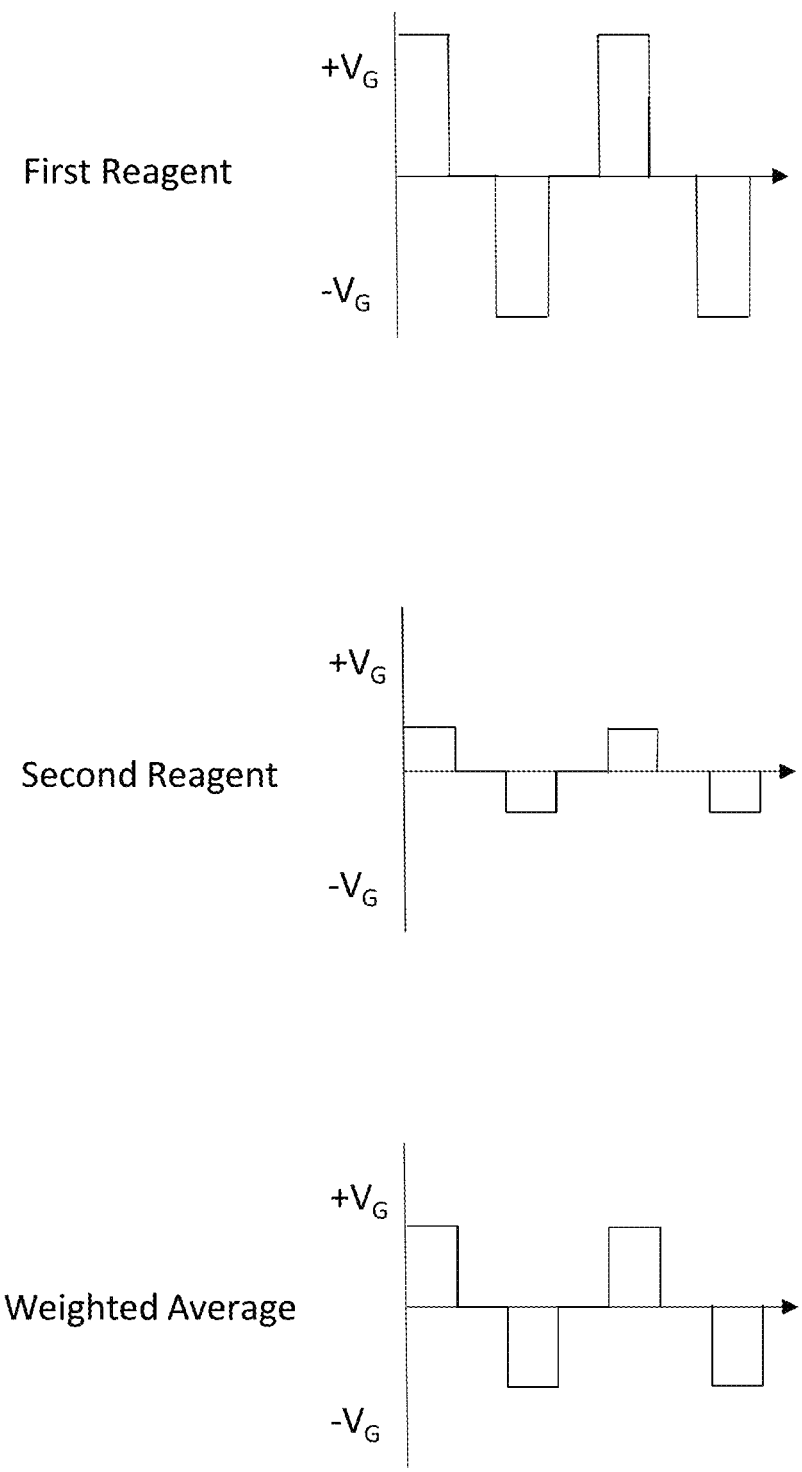
FIG. 10C illustrates the creation of an example weighted average drive sequence.

Droplet elongation is usually applicable to droplets having a footprint large enough to cover at least four pixels in the DMF device. In one embodiment, the mixing scheme includes a droplet elongation drive sequence of the type schematically illustrated in FIG. 10. In the initial stage depicted in FIG. 10A, the droplet is symmetric in shape and spread over a 2×2 pixel square. An elongating drive sequence is applied, stretching the droplet to form a linear configuration one pixel wide and four pixels in length (FIG. 10B). A second drive sequence is then applied to restore the original configuration of FIG. 10A, and the process may be repeated until a satisfactory level of mixing is achieved. This approach may be applied to any droplet with a footprint covering a square area n pixels in height and n pixels in length, n being a natural number. The elongating drive sequence stretches the droplet to yield a linear arrangement 1 pixel high and $n^2$ pixels long, followed by a second drive sequence restoring the original, symmetric droplet geometry. Here, too, the process may be repeated until the mixing is complete. As anticipated above, the merging of droplets containing different reagents may result in product droplets having different mobility than the original droplets. To facilitate mixing, the mixing drive sequences may be formed by a weighted averaging of drive sequences correlated to the original reagent droplets. In the representative example of FIG. 10C, a droplet of a first reagent is merged with a droplet of a second reagent. It can be seen that the drive sequence optimized for and applied in the instance of the first reagent features pulses of higher voltage than the second reagent. Following merger, this difference is accounted for by applying a mixing sequence formed by a weighted averaging of the first and second sequences. In this instance, the pulses of the third drive sequence are the same in number and frequency as in the first reagent and second reagent drive sequences. However, the pulse voltages applied in the third sequence are weighted averages of the first and second reagent drive sequences, thereby providing a drive scheme better suited to the mixture. In other non-exclusive approaches, weighted averaging may be applied to pulse length and/or frequency, resulting in a mixing sequence differing in pulse length and/or frequency from either or both the first and second sequences.

In some embodiments, there is provided a "splitting scheme", which may implemented for splitting a droplet into two or more droplets. As anticipated above, the term "splitting" is not intended to imply any particular outcome with respect to volume of the resulting droplets (i.e., the volume of the resulting droplets can be the same or different) or number of resulting droplets (the number of resulting droplets may be 2, 3, 4, 5 or more). Included in this type of scheme are one or more drive sequences for elongating a droplet within the microfluidic space to form a neck that is severed to yield two product droplets. The separation of different droplet components may result in product droplets having different contents than the original droplet. Taking as example a droplet containing magnetically responsive beads, the splitting scheme may involve immobilizing the beads at a single place by application of a magnetic field and splitting the droplet to yield a first product droplet containing the beads and a second product droplet free of beads. In instances where a desired product compound is covalently bound or absorbed to the surface of the beads, this process allows for the separation of the compound from other components of the droplet.

In a number of embodiments, droplets may be held in place and prevented from unwanted drifting by implementing what is hereinafter referred to as a "holding scheme". As no motion is imparted to the droplets, pulse sequences containing an intermittent single pulse of limited duration are usually sufficient. For a number of solutions containing surfactants a single short negative drive pulse is enough to hold a droplet in place even after the voltage pulse is turned off. The droplet remains held in place until the application of a positive pulse. Typically, a single pulse at a potential of about −30 V for a duration of about 200 ms is sufficient for holding droplets that contain surfactants. If the drop is pure water, or water with buffers as may be used in some washing solutions, a constant holding voltage of alternating polarity to avoid device damage from extended DC bias may be required to hold the droplet since a single negative pulse does not typically hold this type of droplet in place. The holding voltage may be less than the moving voltage if the controller is capable of applying variable potentials, but could be the same as the movement voltage if that is all that is available in the controller. For each type of reagent droplets, suitable drive sequences may be developed and saved to the look up table.

EXAMPLES

The following Examples are now given, though by way of illustration only, to show details of particularly preferred methods according to various embodiments of the present invention.

Example 1

Figure 12:
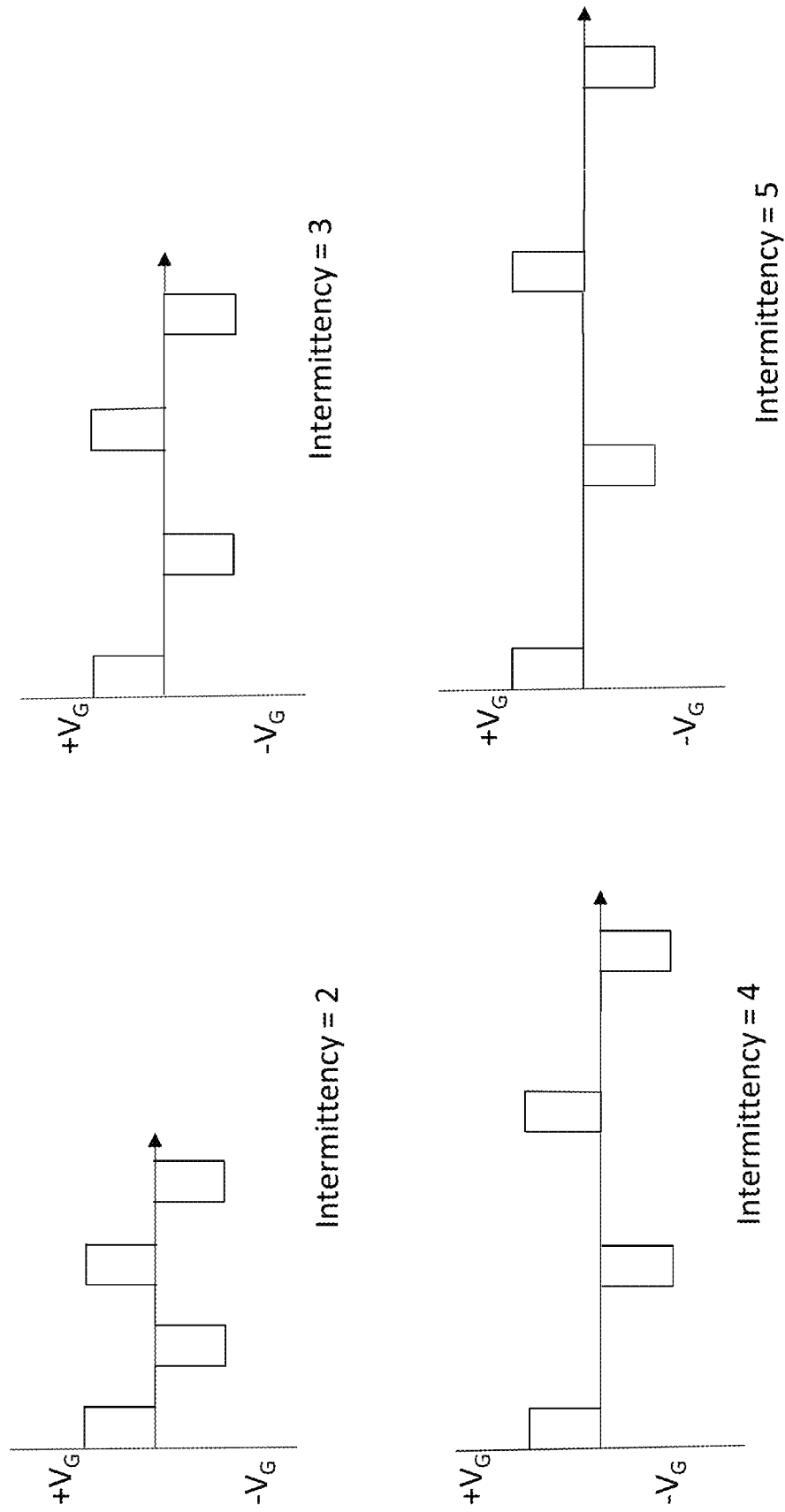
FIG. 12 is a schematic illustration of drive sequences having different intermittency values.

A DMF device surface was prepared by depositing metal oxide dielectric material onto a square TFT array 5.61 inches in length followed by a hydrophobic coating of Teflon AF® (Poly [4,5-difluoro-2,2-bis(trifluoromethyl)-1,3-dioxole-co-tetrafluoroethylene], Sigma-Aldrich Inc., St. Louis, Mo.). A first solution of Tris-HCl 0.01 M in water was prepared and brought to pH 4 by addition of a mineral acid. A second solution was formed by modifying a portion of the first solution through the addition of TWEEN® 20 (Polyoxyethylene (20) sorbitan monolaurate) to a final concentration of 0.05 wt %. Holding schemes were developed and tested on both the first and second solution. Each holding scheme featured intermittent drive sequences where the electrodes under a droplet were first actuated then left idling for the rest of the duration of the hold. As intended herein, the extent of intermittency characterizing a drive sequence is directly proportional to the portion of overall time spent idling. For example, as schematically illustrated in FIG. 12, a driving sequence having an intermittency value of 2 actuates the electrodes for one half of the duration of the hold while a value of 3 applies to driving sequences where the electrodes are actuated for one third of the duration, and so on.

Figure 13B:
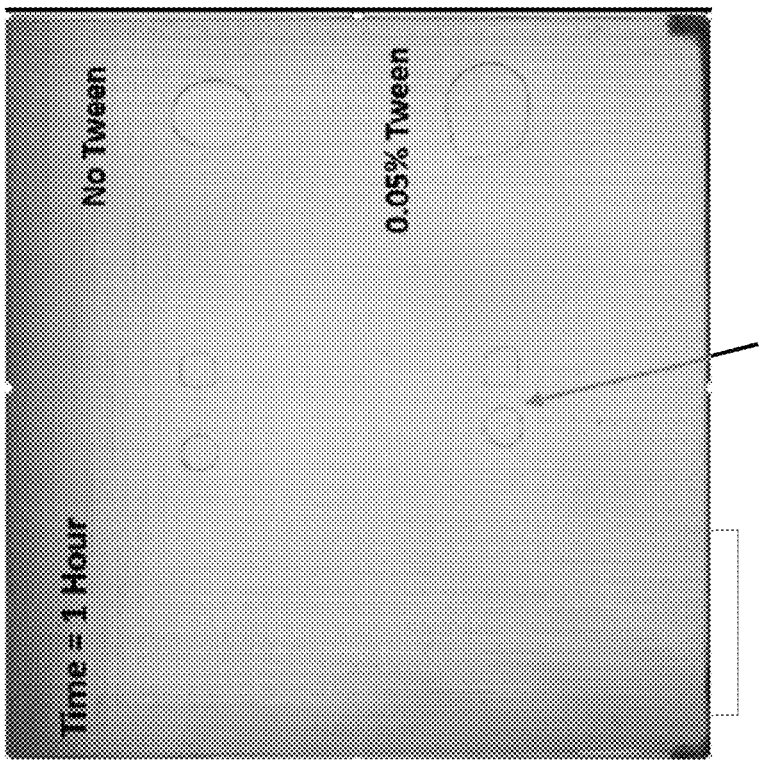
FIG. 13B is the DMF of FIG. 13A pictured after about 1 hour of operation.
Figure 13A:
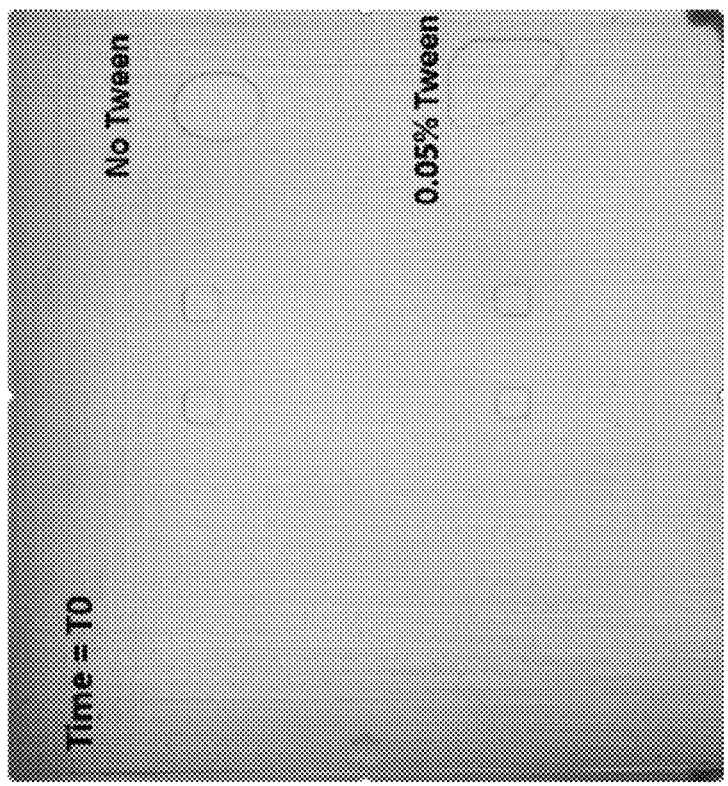
FIG. 13A is a top view of a DMF device.
Figure 13D:
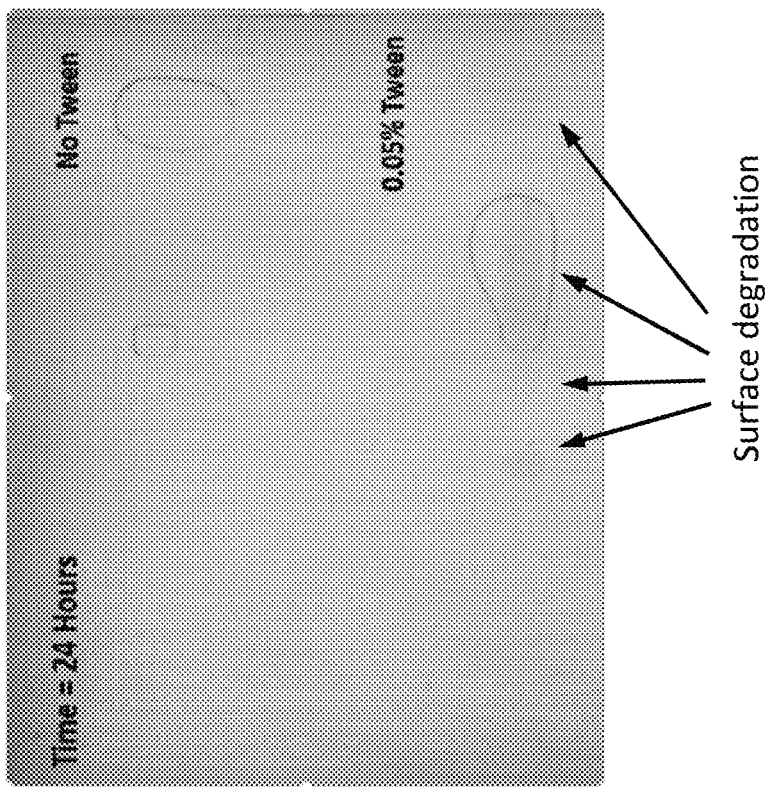
FIG. 13D is a picture taken after about 24 hours of operation.
Figure 13C:
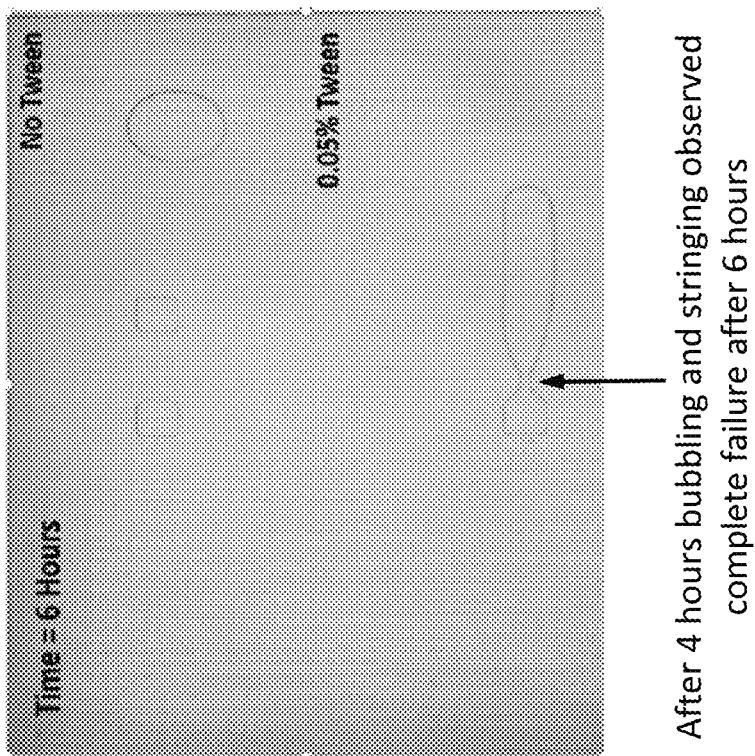
FIG. 13C is a picture taken after about 6 hours of operation.
Figure 13E:
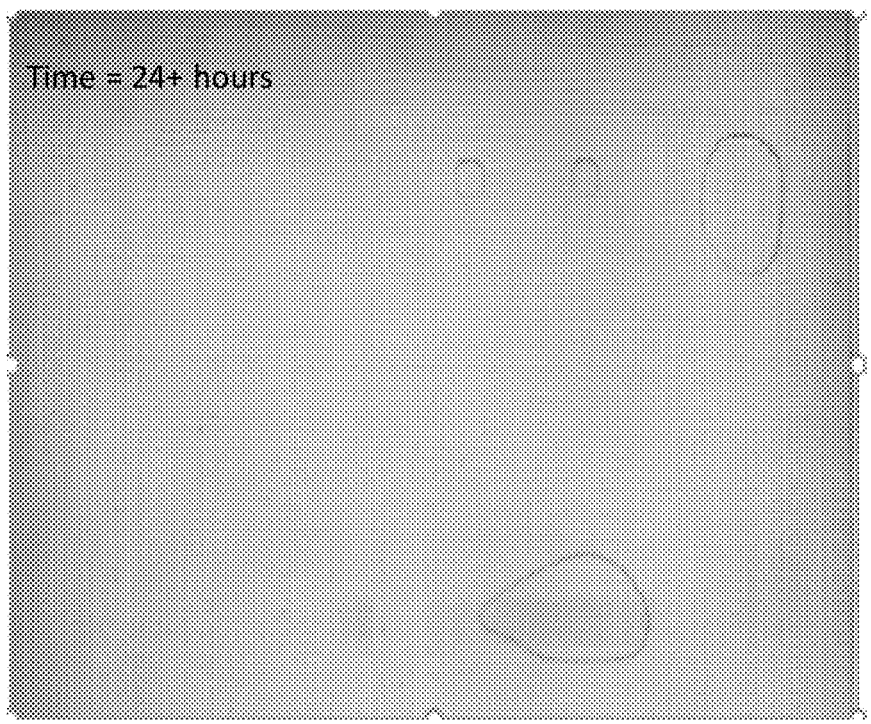
FIG. 13E is a picture taken after about 25 hours of operation.

Reservoirs of both the first and second solution were formed in the microfluidic test of the DMF device and tested with holding schemes of increasing intermittency. When applied to the first solution, holding schemes with intermittency values lower than 4 degraded the DMF performance until complete failure invariably occurred within 5 to 6 hours of continuous driving. As depicted in FIGS. 13A-13F, however, when the intermittency value of the holding scheme was increased to 4, improved results were obtained. FIG. 13A is a picture of the DMF shortly after time zero (TO), with the first solution loaded in a first reservoir ("No TWEEN® 20") and the second solution in a second reservoir ("0.05% TWEEN® 20"). The first reservoir is loaded with a solution of Tris-HCl 0.01 M in water ("No TWEEN® 20"). The second reservoir includes the solution of the first reservoir modified by the addition of TWEEN® 20 at a concentration of 0.05% ("0.05% TWEEN® 20"). Two droplets were dispensed from each reservoir and kept in position by applying a holding scheme having an intermittency value of 4. After 1 hour of operation, as shown in FIG. 13B, the 0.05% TWEEN® 20 droplets began to significantly drift from their assigned positions, indicating a degradation in performance and requiring a drop in intermittency to a value of 2 to restore stability and stop drifting. After about 4 hours, the 0.05% TWEEN® 20 reservoir began bubbling and stringing until complete failure and reservoir drifting was observed at a time of 6 hours (FIG. 13C). After about 24 hours, it was only possible to dispense 1 droplet from the No TWEEN® 20 reservoir, and surface degradation was apparent as dark streaks in areas where the TWEEN® 20 solution was or had been present (FIG. 13D). However, the droplets were very consistent in size and there were no signs of bubbling or increases in hydrophobicity due to surface degradation. Accordingly, in an attempt to determine whether the reservoir was underfilled, the droplet dispense volume was changed to 6×6 pixels, and reservoir resumed dispensing 2 droplets at 24 hours and beyond (FIG. 13E). It can be seen that the No TWEEN® 20 reservoirs is exhibiting no sign of bubbling, stringing, or drifting.

As seen from the results of the aforementioned experiments, drive sequences having an intermittency of at least 4 may enable the manipulation of Tris-buffered droplets for durations of 24 hours or more with no drop in DMF performance. Lower degrees of intermittency, though more efficient in holding droplets in position, appear to cause excessively pronounced degradation and early systemic failure. Increasing intermittency to levels greater than 4, for instance 5, 10, or higher, is likely to lead to even slower performance loss, but at the cost of lower efficacy in limiting droplet drift. In sum, lower intermittency is associated with higher efficacy but faster degradation, and vice versa. As such, a balance may be struck between these two competing requirements by testing drive sequences of different intermittencies on a given composition until a satisfactory regimen is found. Thereafter, the drive sequences may be made part of holding scheme which is part of the drive profile associated with the composition.

Example 2

A search for drive schemes best suited to dispensing aqueous droplets containing TWEEN® 20 as surfactant was conducted on the DMF array of Example 1. A 0.1 wt % TWEEN® 20 solution in water was deposited into two reservoirs on the edge of the array, then the drive sequences of Table 1 were each tested for dispensing droplets from the reservoirs into the array. The table lists the voltages of pulses applied at each frame in the course of each sequence. As disclosed above, the pulse voltage is the difference in electric potential between the two electrodes associated with a pixel:

TABLE 1

| Drive Sequence | Frame Sequence (Pulse Voltages) |
|---|---|
| 1 | High, Low, 0, High, Low, 0 . . . |
| 2 | High, Low, High, 0, Low, High, Low, 0 . . . |

FIG. 14 is a top view of the DMF array after testing of each sequences. Successful dispensing of droplets is framed in green, while failures are framed in red. It can be seen that drive sequence 2 failed to dispense both reservoirs. In contrast, drive sequence 1 successfully dispensed all reservoirs, thereby proving their suitability to TWEEN® 20 aqueous solutions. It is to be understood that the drive sequences are not limited to particular voltage values. For example, the high voltage may be +40V, +35V, +30V, +28V, +27V, +25V, +24V, +22V, +20V, +18V, +16V, or +15V, and the corresponding low voltage may be opposite in sign to the corresponding high voltage, i.e., −40V, −35V, −30V, −28V, −27V, −25V, −24V, −22V, −20V, −18V, −16V, or −15V.

Figure 15:
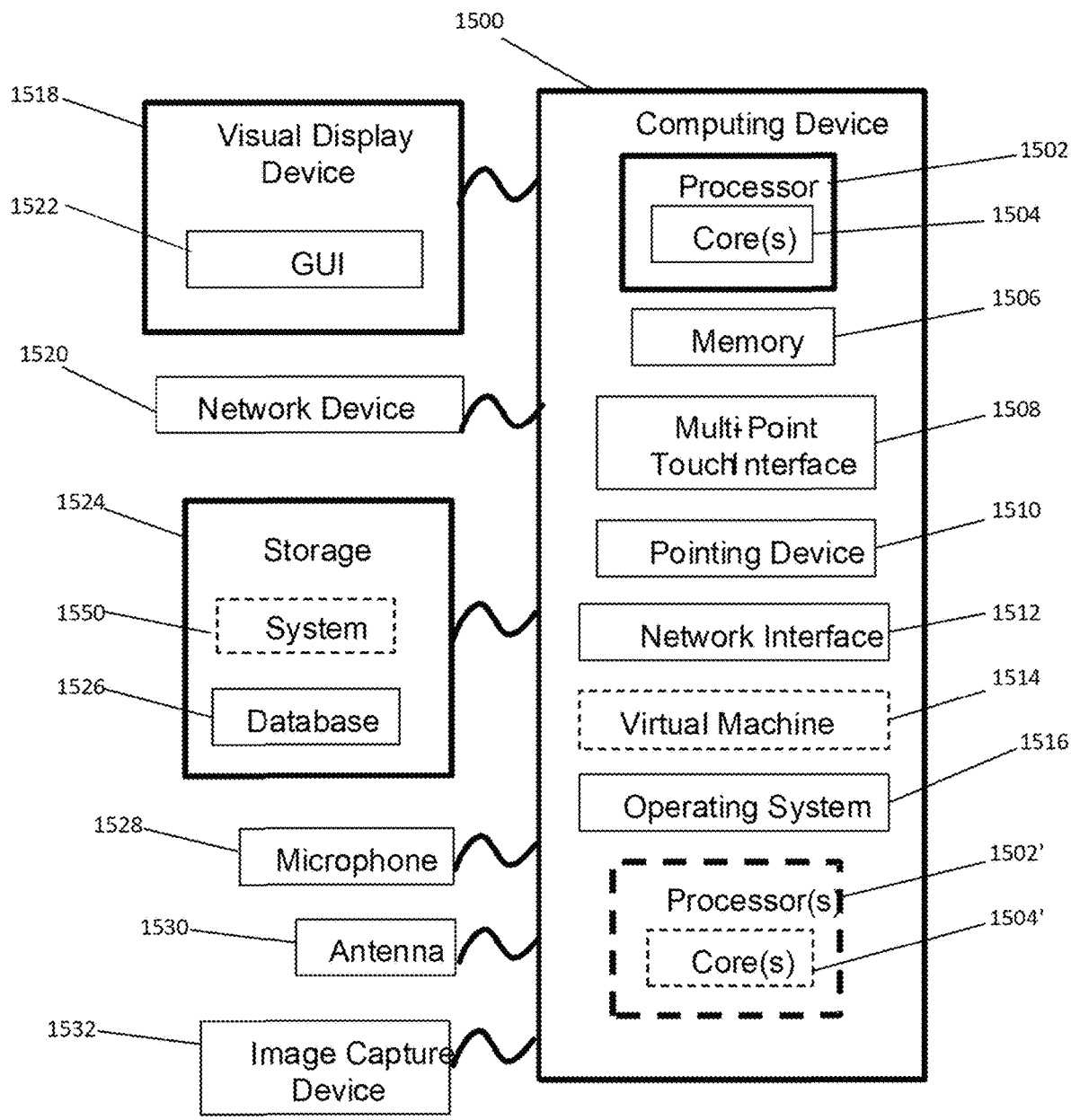
FIG. 15 is a block diagram of an exemplary computing device that can be used to perform one or more steps of the methods provided by exemplary embodiments.

FIG. 15 is a block diagram of an exemplary computing device that can be used to perform one or more steps of the methods provided by exemplary embodiments. For example, computing device 1500 may be, but is not limited to the system as described in FIG. 3A. The computing device 1500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 1506 included in the computing device 1500 can store computer-readable and computer-executable instructions or software for implementing exemplary embodiments. The computing device 1500 also includes processor 1502 and associated core 1504, and optionally, one or more additional processor(s) 1502' and associated core(s) 1504' (for example, in the case of computer systems having multiple processors/cores), for executing computer-readable and computer-executable instructions or software stored in the memory 1506 and other programs for controlling system hardware. Processor 1502 and processor(s) 1502' can each be a single core processor or multiple core (1504 and 1504') processor. The computing device 1500 also includes a graphics processing unit (GPU) 1505. In some embodiments, the computing device 1500 includes multiple GPUs.

Virtualization can be employed in the computing device 1500 so that infrastructure and resources in the computing device can be shared dynamically. A virtual machine 1514 can be provided to handle a process running on multiple processors so that the process appears to be using only one computing resource rather than multiple computing resources. Multiple virtual machines can also be used with one processor.

Memory 1506 can include a computer system memory or random access memory, such as DRAM, SRAM, EDO RAM, and the like. Memory 1506 can include other types of memory as well, or combinations thereof. A user can interact with the computing device 1500 through a visual display device 1518, such as a touch screen display or computer monitor, which can display one or more user interfaces 1519. The visual display device 1518 can also display other aspects, elements and/or information or data associated with exemplary embodiments. The computing device 1500 can include other I/O devices for receiving input from a user, for example, a keyboard or any suitable multi-point touch interface 1508, a pointing device 1510 (e.g., a pen, stylus, mouse, or trackpad). The keyboard 1508 and the pointing device 1510 can be coupled to the visual display device 1518. The computing device 1500 can include other suitable conventional I/O peripherals.

The computing device 1500 can also include one or more storage devices 1524, such as a hard-drive, CD-ROM, or other computer readable media, for storing data and computer-readable instructions and/or software, such as one or more components of the system (also referred to as the system 1550) shown in FIG. 3A that implements exemplary embodiments of the notification system as described herein, or portions thereof, which can be executed to generate user interface 1519 on display 1518. Exemplary storage device 1524 can also store one or more databases for storing any suitable information required to implement exemplary embodiments. The databases can be updated by a user or automatically at any suitable time to add, delete or update one or more items in the databases. Exemplary storage device 1524 can store one or more databases 1526 for storing provisioned data, and other data/information used to implement exemplary embodiments of the systems and methods described herein.

The computing device 1500 can include a network interface 1512 configured to interface via one or more network devices 1522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1512 can include a built-in network adapter, network interface card, PCMCIA network card, card bus network adapter, wireless network adapter, USB network adapter, modem or any other device suitable for interfacing the computing device 1500 to any type of network capable of communication and performing the operations described herein. Moreover, the computing device 1500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1500 can run any operating system 1516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1516 can be run in native mode or emulated mode. In an exemplary embodiment, the operating system 1516 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other embodiments, functions and advantages are also within the scope of the present disclosure It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense. The functional aspects of the invention that are implemented on a processing unit, as will be understood from the teachings hereinabove, may be implemented or accomplished using any appropriate implementation environment or programming language, such as C, C++, Cobol, Pascal, Java, Java-Script, HTML, XML, dHTML, assembly or machine code programming, and the like. All of the contents of the aforementioned patents and applications are incorporated by reference herein in their entireties. In the event of any inconsistency between the content of this application and any of the patents and application incorporated by reference herein, the content of this application shall control to the extent necessary to resolve such inconsistency.

The invention claimed is:

1. A method of performing droplet operations on a first plurality of droplets having a first composition and on a second plurality of droplets having a second composition using an active matrix electrowetting on dielectric AM-EWoD system
    comprising a plurality of electrodes configured to manipulate droplets of fluid in a microfluidic space, wherein the plurality of electrodes are pixel electrodes disposed in the active matrix electrowetting on dielectric AM-EWoD system, wherein the pixel electrodes are switched by a transistor matrix comprising a plurality of transistors and wherein each transistor of the plurality of transistors of the transistor matrix is operably connected to a gate line, to a source line, and to the pixel electrodes, the method comprising:
    performing one or more first droplet operations on the first plurality of droplets and performing one or more second droplet operations on the second plurality of droplets in parallel by driving the pixel electrodes with a first drive sequence having a first series of voltage pulses and with a second drive sequence having a second series of voltage pulses wherein the first series of voltage pulses differs from the second series of voltages pulses, and wherein each voltage pulse sequence of the first series of voltage pulses and each voltage pulse sequence of the second series of voltage pulses includes a mix of high voltage pulses and of low voltage pulses and wherein each voltage pulse sequence of the first series of voltage pulses differs in intermittency from each voltage pulse sequence of the second series of voltage pulses.

2. The method of claim 1, wherein the performing one or more first droplet operations on the first plurality of droplets and the performing one or more second droplet operations on the second plurality of droplets include any of:
    loading a droplet into the microfluidic space;
    dispensing one or more droplets from a reservoir;
    splitting a droplet into two or more droplets;
    moving a droplet from one location to another;
    merging or combining two or more droplets into a single droplet;
    diluting a droplet;
    mixing a droplet;
    deforming a droplet;
    holding a droplet in position;
    heating a droplet;
    cooling a droplet; and
    transporting a droplet out of the microfluidic space;
    or combinations thereof.

3. The method of 1, wherein the performing one or more first droplet operations on the first plurality of droplets and the performing one or more second droplet operations on the second plurality of droplets are performed with the first composition being associated with a first composition parameter and with the second composition being associated with a second composition parameter, and wherein the first composition parameter and the second composition parameter are independently selected from at least one of a chemical species concentration parameter, a rheological property parameter, a pH parameter, a temperature parameter, an ionic strength parameter, a conductivity parameter, and a light absorbance parameter, or combinations thereof.

4. The method of claim 1, wherein the performing one or more first droplet operations on the first plurality of droplets and the performing one or more second droplet operations on the second plurality of droplets are performed with the first drive sequence and the second drive sequence being motion schemes, each motion scheme of the motion schemes for moving droplets from a first location to a second location.

5. The method of claim 4, wherein the performing one or more first droplet operations on the first plurality of droplets and the performing one or more second droplet operations on the second plurality of droplets are performed with each motion scheme of the motion schemes comprising a charge-neutral drive sequence.

6. The method of claim 4, wherein the performing one or more first droplet operations on the first plurality of droplets and the performing one or more second droplet operations on the second plurality of droplets are performed with each motion scheme of the motion schemes comprising a pulse width modulated drive sequence.

7. The method of claim 4, wherein the performing one or more first droplet operations on the first plurality of droplets and the performing one or more second droplet operations on the second plurality of droplets are performed with each motion scheme of the motion schemes comprising a correcting pulse.

8. The method of claim 1, wherein the performing one or more first droplet operations on the first plurality of droplets and the performing one or more second droplet operations on the second plurality of droplets are performed with the first drive sequence and the second drive sequence being dispensing schemes for dispensing droplets from a reservoir.

9. The method of claim 1, wherein the performing one or more first droplet operations on the first plurality of droplets and the performing one or more second droplet operations on the second plurality of droplets are performed with the first drive sequence and the second drive sequence being merging schemes, each merging scheme of the merging schemes for merging together two or more droplets or with the first drive sequence and the second drive sequence being mixing schemes, each mixing scheme of the mixing schemes for mixing droplets formed from a merger of two or more reactant droplets.

10. The method of claim 9, wherein each mixing scheme of the mixing schemes comprises a droplet elongation drive sequence.

11. The method of claim 1, wherein the performing one or more first droplet operations on the first plurality of droplets and the performing one or more second droplet operations on the second plurality of droplets are performed with the first drive sequence and the second drive sequence being holding schemes, each holding scheme of the holding schemes comprising an intermittent single pulse.

12. The method of claim 1, wherein the performing one or more first droplet operations on the first plurality of droplets and the performing one or more second droplet operations on the second plurality of droplets are performed with the first plurality of droplets having the first composition and with the second plurality of droplets having the second composition moving simultaneously in the active matrix electrowetting on dielectric AM-EWoD system.

13. The method of claim 1, wherein the performing one or more first droplet operations on the first plurality of droplets and the performing one or more second droplet operations on the second plurality of droplets are performed with a first portion of the pixel electrodes being driven with the first drive sequence and a second portion of the pixel electrodes being driven with the second drive sequence overlapping in time.

14. The method of claim 1, wherein the active matrix electrowetting on dielectric AM-EWoD system comprises:
 a processing unit operably connected to a storage medium holding a plurality of pulse drive waveform sequences correlated to chemical species and to composition parameters.

* * * * *